United States Patent
Akay

(10) Patent No.: US 9,416,019 B2
(45) Date of Patent: Aug. 16, 2016

(54) AMMONIA PRODUCTION BY INTEGRATED INTENSIFIED PROCESSES

(75) Inventor: Galip Akay, Tyne and Wear (GB)

(73) Assignee: University of Newcastle upon Tyne, Newcastle upon Tyne (GB)

( * ) Notice: Subject to any disclaimer, the term of this patent is extended or adjusted under 35 U.S.C. 154(b) by 0 days.

(21) Appl. No.: 13/819,212

(22) PCT Filed: Aug. 30, 2011

(86) PCT No.: PCT/GB2011/051620
§ 371 (c)(1),
(2), (4) Date: Aug. 12, 2013

(87) PCT Pub. No.: WO2012/025767
PCT Pub. Date: Mar. 1, 2012

(65) Prior Publication Data
US 2013/0309161 A1    Nov. 21, 2013

(30) Foreign Application Priority Data

Aug. 27, 2010  (GB) .................................. 1014304.8

(51) Int. Cl.
*C01C 1/04* (2006.01)
*C01B 3/02* (2006.01)
(Continued)

(52) U.S. Cl.
CPC ............... *C01C 1/0405* (2013.01); *C01B 3/025* (2013.01); *C01C 1/0494* (2013.01); *C10J 3/22* (2013.01); *C10J 3/30* (2013.01); *C10J 3/42* (2013.01); *C01B 2203/04* (2013.01);
(Continued)

(58) Field of Classification Search
CPC .. C01C 1/0405; C01C 1/0417; C01C 1/0494; C01B 3/025; C01B 3/50; C01B 3/501; C01B 3/503; C01B 3/505; C01B 2203/0405; C01B 2203/041; C01B 2203/068; C01B 2210/001; C01B 2210/0012; C01B 3/02; C01B 2210/0009; C10J 2300/1668; C10J 2300/1678
USPC ................ 423/351, 359–363; 422/617; 95/45
See application file for complete search history.

(56) References Cited

U.S. PATENT DOCUMENTS 6,282,880 B1 *  9/2001  Wallace et al. ................. 60/780
7,300,642 B1    11/2007  Pedersen et al.
(Continued)

FOREIGN PATENT DOCUMENTS

EP    0 916 385 A1    5/1999
EP    0926097 A1      6/1999
(Continued)

OTHER PUBLICATIONS

M. Bai, et al., "Plasma Synthesis of Ammonia With a Microgap Dielectric Barrier Discharge at Ambient Pressure," IEEE Transactions on Plasma Science, vol. 31, No. 6, pp. 1285-1291; Dec. 2003 (7 pages).
(Continued)

*Primary Examiner* — Anthony J Zimmer
(74) *Attorney, Agent, or Firm* — Osha Liang LLP

(57) ABSTRACT

An ammonia production process is disclosed. The process uses gasification of biomass waste and the like to produce syngas which, using an integrated system including using nitrogen enriched air and a porous coated catalyst, produces ammonia in a plasma reactor. The ammonia is finally recovered using sulphonated PolyHIPE Polymer which can be used as a fertilizer after neutralization.

3 Claims, 14 Drawing Sheets

(51) Int. Cl.
*C10J 3/22* (2006.01)
*C10J 3/30* (2006.01)
*C10J 3/42* (2006.01)

(52) U.S. Cl.
CPC .. *C01B 2203/0405* (2013.01); *C01B 2203/047* (2013.01); *C01B 2203/048* (2013.01); *C01B 2203/0475* (2013.01); *C01B 2203/0495* (2013.01); *C01B 2203/068* (2013.01); *C10J 2200/156* (2013.01); *C10J 2200/158* (2013.01); *C10J 2300/0916* (2013.01); *C10J 2300/0956* (2013.01); *C10J 2300/0959* (2013.01); *C10J 2300/0969* (2013.01); *C10J 2300/1612* (2013.01); *C10J 2300/1668* (2013.01); *C10J 2300/1678* (2013.01); *C10J 2300/1815* (2013.01); *Y02P 20/145* (2015.11); *Y10T 428/2991* (2015.01)

(56) References Cited

U.S. PATENT DOCUMENTS

| | | | |
|---|---|---|---|
| 7,820,729 | B2 | 10/2010 | Akay et al. |
| 2006/0090395 | A1* | 5/2006 | Rode et al. ............... 48/61 |
| 2006/0228284 | A1* | 10/2006 | Schmidt ............... 423/352 |
| 2008/0115478 | A1 | 5/2008 | Sullivan |
| 2009/0019767 | A1* | 1/2009 | Abughazaleh et al. ...... 48/61 |

FOREIGN PATENT DOCUMENTS

| | | |
|---|---|---|
| WO | 2006005269 A2 | 1/2006 |
| WO | 2006040081 A1 | 4/2006 |
| WO | 2008097644 A1 | 8/2008 |
| WO | 2009/025835 A1 | 2/2009 |
| WO | 2010/040996 A2 | 4/2010 |

OTHER PUBLICATIONS

J. Nakajima, et al., "Synthesis of ammonia using microwave discharge at atmospheric pressure," Thin Solid Films 516 (2008), pp. 4446-4451; Oct. 16, 2007 (6 pages).

International Search Report issued in PCT/GB2011/051620, mailed Mar. 20, 2012 (5 pages).

Annex to Form PCT/ISA/206 (Invitation to Pay Additional Fees): Communication Relating to the Results of the Partial International Search, issued in International Application No. PCT/GB2011/051620, mailed Nov. 7, 2011 (7 pages).

G.F. Skinner; "Production of Ammonia by Air Gasification Method"; The British Sulphur Corporation's Fourth International Conference of Fertilised Technology; Jan. 19-21, 1981 (3 pages).

G.F. Skinner: "Ammonia Production Using Air Gasification"; Proceedings of The British Sulphur Corporation's Fourth International Conference of Fertilised Technology, Paper 24 (12 pages).

* cited by examiner (a)     (b)     (c)

(a)           (b)

(a)                                    (b)

a) Overall structure           b) Skin c) Core structure (a)  Overall structure  (b)  Interface between skin & core

AMMONIA PRODUCTION BY INTEGRATED INTENSIFIED PROCESSES

The present invention relates to a method of producing ammonia and particularly, but not exclusively, relates to a method of gasification of biomass in an integrated system to produce ammonia.

The most common large scale production method for ammonia utilises natural gas as a source of hydrogen and conversion energy. Gasification of biomass and similar fuel sources can also be used to produce hydrogen and this can similarly be used in ammonia production. However, these methods of ammonia production involve repeated pressurization-depressurization, heating-cooling and adsorption-desorption stages, thus making it energy intensive and inefficient process and making natural gas the most economical source of hydrogen for ammonia production.

Preferred embodiments of the present invention seek to overcome the above described disadvantages of the prior art.

According an aspect of the present invention there is provided a method of production of ammonia comprising the steps of:

gasification of combustible material to produce syngas, the gasification process including extracting oxygen from air for use in the gasification process thereby producing nitrogen enriched air;

substantially removing oxygen from said nitrogen enriched air to produce substantially oxygen free air;

separating hydrogen from said syngas; and reacting said hydrogen with said substantially oxygen free air to produce ammonia.

By removing oxygen from an air stream to provide oxygen to a gasification process and provide a nitrogen enriched airstream, then removing further oxygen from the nitrogen enriched airstream and reacting the nitrogen therein with hydrogen from the syngas produced from the gasification process to produce ammonia, provides the advantage that this integrated system is an efficient means for the production of ammonia. In particular, removal of oxygen from an airstream produces nitrogen enriched air which can then be used with hydrogen produced by the gasification process to produce ammonia. In this integrated system high temperatures are maintained through the system increasing the efficiency of ammonia production. Furthermore, unlike the prior art method for industrial ammonia production where the reaction mixture includes nitrogen, hydrogen, carbon monoxide, carbon dioxide, oxygen and water, in the method of the present invention there are no potential catalyst poisons present; i.e., carbon compounds and both oxygen and water are minimised. Oxygen in the reaction mixture is consumed through water generation which, together with ammonia, is adsorbed or condensed when the reaction mixture leaves the first ammonia reactor.

Current ammonia production method represents a large production capacity central production system suitable for using feedstock derived from fossil fuels which are also produced in central processing chemical plants. The method of the present invention is particularly suitable for small production capacities since it aims to use renewable resources such as biomass and biomass waste. However, production at small scale is sustainable through the integration of intensified processes on a large scale ranging from the feedstock to product generation. Process Intensification technology has been shown to be suitable for small scale production (see G. Akay, Biochemical and chemical process Intensification, in Encyclopaedia of Chemical Processing, pp. 185-198, Ed: S. Lee, Marcel Dekker, NY, 2006).

In a preferred embodiment the oxygen is extracted from the air using an oxygen selective membrane.

By using an oxygen selective membrane, the advantage is provided that oxygen is extracted from the airstream very efficiently. Furthermore, the proximity of the membrane to the hot zones (oxidation zone and reduction) of the gasifier elevates the temperature of the membrane to a level where it works very efficiently.

In a preferred embodiment the oxygen is removed by combustion with syngas from which hydrogen has been removed.

By using some of the hydrogen depleted syngas produced in the gasification process after hydrogen separation from syngas, further oxygen removal from the airstream enhances the concentration of nitrogen for use in ammonia synthesis. This process further enhances the efficiency of the system since the heat generated by the burning of the hydrogen depleted syngas can be used to provide heat in the combustion zone of the gasifier whilst at the same time removing all (or almost all) further oxygen from the nitrogen enriched airstream.

In a preferred embodiment the hydrogen is extracted from the syngas using at least one hydrogen selective membrane.

By using a hydrogen selective membrane to extract hydrogen from the syngas, the advantage is provided that the membrane provides very efficient extraction of hydrogen from the syngas. Upon complete combustion of the hydrogen depleted syngas in the second reactor with oxygen selective membrane, syngas is converted to carbon dioxide and water which can be recycled back into the gasifier reactor to provide energy as well as carbon dioxide and water in order to enhance hydrogen generation.

In a preferred embodiment the reaction to produce ammonia takes place in a plasma reactor.

By using a plasma reactor to produce ammonia, the advantage is provided that ammonia can be produced from hot streams of gases at or near atmospheric pressure with effective productive rates without needing to increase the pressure or alter the temperature of the gas streams leaving the gasification process.

According to another aspect of the present invention, there is provided an apparatus for the production of ammonia, the apparatus comprising:

at least one gasifier for gasification of combustible material to produce syngas, the gasifier including at least one first oxygen removal device for extracting oxygen from air for use in the gasification process thereby producing nitrogen enriched air;

at least one second oxygen removal device for substantially removing oxygen from said nitrogen enriched air to produce substantially oxygen free air;

at least hydrogen separating device for separating hydrogen from said syngas; and at least one reaction device for reacting said hydrogen with said substantially oxygen free air to produce ammonia.

In a preferred embodiment at least one first oxygen removal device comprises an oxygen selective membrane.

In another preferred embodiment at least one said second oxygen removal device comprises at least one combustion device for combustion with syngas from which hydrogen has been removed.

In a preferred embodiment, the hydrogen separating device comprises at least one hydrogen selective membrane.

In another preferred embodiment the reaction device comprises a plasma reactor.

According to another aspect of the present invention, there is provided an air input system for a gasifier, the input system comprising:

at least one input for receiving air;

at least one oxygen selective membrane adapted to be located adjacent a combustion zone of a gasifier, the membrane allowing oxygen from said received air to pass through said membrane and into said gasifier.

By locating an oxygen selective membrane adjacent the combustion zone of a gasifier and directing an airstream on to that membrane, the advantage is provided that oxygen can be extracted from the freely available air. Furthermore, oxygen selective membranes operate most efficiently when heated to a temperature similar to that produced in a gasifier. Because oxygen is used in the gasification process, the oxygen is immediately removed after passing through the membrane. As a result there is a chemical potential for oxygen reaction immediately adjacent the gasifier side of the membrane thereby encouraging oxygen through the membrane. Furthermore, the use of the membrane creates the subsidiary product of nitrogen enriched air which can subsequently be used in the production of ammonia.

The air input system may further comprise air extraction means for directing air from which oxygen has been extracted.

By providing extraction means, the advantage is provided that a continuous stream of fully oxygenated air is provided to the membrane.

The air input system may further comprise at least one support layer bonded to the membrane.

By providing a porous support layer bonded to the membrane, the advantage is provided that the membrane will be more robust both mechanically and thermally adsorbing the mechanical and thermal stresses and allowing a very thin and efficient membrane to be used.

In another preferred embodiment the membrane further comprises at least one first catalyst layer.

By providing a catalyst on the permeate side of the membrane the advantage is provided that this encourages oxidation during the gasification process which in turn encourages oxygen to be drawn through the membrane. By providing a catalyst on the feed side of the oxygen selective membrane, the advantage is provided that this encourages the dissociation of oxygen molecules thus accelerating the diffusion of oxygen through the membrane.

In another preferred embodiment the membrane further comprises at least one second catalyst layer located further away from said membrane than said first catalyst layer.

By providing a porous sacrificial catalyst on the reaction sides of the membranes, both the catalyst and membranes are protected from poisoning as a result of the catalyst poison reaction with the sacrificial porous catalyst. The sacrificial catalyst is not active and is inexpensive compared with the protected catalyst and the selective membrane.

According to another aspect of the present invention, there is provided a catalyst comprising:

a least one catalyst body comprising at least one catalyst material; and at least one coating extending substantially around said catalyst material and including at least one porous material allowing reactants to diffuse through said porous material and engage with said catalyst material.

By coating a catalyst with a porous material, the advantage is provided that the porous material can provide a physical protection to the catalyst's surface.

In a preferred embodiment the coating is substantially electrically insulating.

By using a porous dielectric barrier coating on the catalyst particles the advantage is provided that the catalyst itself is used as a dielectric barrier. It is then possible to use the dielectric barrier coated catalysts in a plasma reactor with only one (or even neither) electrode isolated by a dielectric barrier. If the catalyst is metallic and hence has sufficient electrical conductivity, it acts an electrode if it is not isolated through a dielectric barrier. The use of dielectric barrier coated catalysts as a packed bed in the space between the electrodes (one of which is isolated) hence allows the lowering of power consumption for plasma generation and increases the separation distance between the electrodes while still forming plasma. By using a porous dielectric barrier coating on the catalyst particles the advantage is provided that the dielectric barrier discharge plasma is generated near the vicinity of the catalyst since the catalyst itself is used as a dielectric discharge barrier. The reactive chemical species generated by the plasma in the vicinity of the catalyst then rapidly diffuse through the catalyst coating into the porous catalyst for chemical conversion before recombination thus accelerating both the rate of reaction and yield.

In a preferred embodiment the coating comprises Barium oxide (BaO).

In a further preferred embodiment the coating comprises Barium titanate ($BaTiO_3$).

By using ceramic or relatively high dielectric constant (permittivity) metal oxides such as barium oxide, silica, titanium oxide (with permittivity in the range of 10) or high permittivity mixed oxides such as pervoskites or very high permittivity materials such as Barium titanate (permittivity 1000), it is possible to enhance plasma strength.

According to another aspect of the present invention there is provided a method of producing a catalyst comprising the steps of coating a catalyst body with a porous material adapted to allow reactants to diffuse through said material and engage with said catalyst.

According to a further aspect of the present invention, there is provided a method of catalysing a reaction comprising the steps of mixing reactants with a catalyst according to the method of ammonia production set out above.

According to another aspect of the present invention, there is provided a plasma reactor comprising:

at least one vessel adapted to receive reactants;

a plurality of electrodes contained within an outermost volume of said vessel; and at least one granular catalyst material coated with a porous and substantially electrically insulating material.

By coating a catalyst with electrically insulating material and placing it within a vessel that also contains electrodes, the advantage is provided that the electrodes can be contained within the vessel whilst also having the normally electrically conducting catalyst located therein. As a result, plasma is very efficiently produced within the vessel whilst also containing the catalyst resulting in high product yields.

In a preferred embodiment the vessel comprises at least one electrode.

The vessel may be tubular

In another preferred embodiment at least one electrode extends substantially along the centre of said tubular vessel.

By using a concentric tubular quartz plasma reactor, the advantage is provided that although the distance between the electrodes can be small, the volume of the plasma space where the catalyst bed is located can be controlled and the residence time of the reactants can be large at high space velocities having sufficient time for the reaction. If the gas space velocity required is small, the cylindrical reactor configuration is preferred. Low gas space velocities are useful in order to prevent erosion of the catalyst particle as well as for high conversions.

By using a highly porous catalyst, the advantage is provided that the reactants and activated chemical species reach the catalytic sites faster before the activated chemical species become deactivated through recombination. This advantage is also true for the catalyst coating which is also porous.

By using a plasma reactor with coated catalyst the advantage is provided that the plasma is used to activate the reactants such as nitrogen and hydrogen in ammonia synthesis even at low temperatures and pressures. Therefore the resultant reactors operate at low pressures and temperatures providing capital and operational cost advantages. However, in the case ammonia synthesis, in order to achieve high conversion rates, in the optimised industrial practice of the prior art, the operational pressure range is 150-250 atm and the typical temperature range is 350-550° C. Although high pressure and low temperature favour high conversion, the industrial process of the prior art is such that only 10-15% conversion is attained per pass through the reactor followed by ammonia recovery at low temperatures and repeat of the process. The equilibrium conversion under the optimum conditions is around 50% thus the conversion of range of 15% is well below the thermodynamic equilibrium conditions. By using plasma reactors at atmospheric pressure and low temperature (150-250° C.), the equilibrium conversion range is 25% (at 150° C.) and 5% (at 250° C.). The present technique can achieve 5-10% conversion despite working under significantly lower pressures and temperatures but achieving conversion rates closer to the equilibrium values. This in turns allows for significantly reduced capital cost and reduced running costs. As a result small scale plants are economically viable although the process is equally applicable to large scale ammonia production.

According to a further aspect of the present invention, there is provided a method of extracting ammonia from a stream of ammonia production gases including ammonia, hydrogen and nitrogen comprising the steps of:
passing a stream of gases including ammonia through a bed of a strong acid ion exchange resin, wherein at least some ammonia is adsorbed onto said bed;
recycling said stream of gases once at least some ammonia is removed for further reaction.

In a preferred embodiment the strong acid ion exchange resin comprises sulphonated PolyHIPE Polymer (PHP).

In another preferred embodiment the strong acid ion exchange resin comprises hyper cross-linked sulphonated ion exchange resins.

This method for extracting ammonia from a stream including hydrogen and nitrogen from which the ammonia has been reacted includes passing it through the acid form of sulphonated nano-structured micro-porous polymers known as PolyHIPE Polymers (mainly styrene-divinyl benzene cross-linked copolymers) and then either recycling the stream of unreacted hydrogen and nitrogen back into the reactor or feeding the unreacted gas stream into the second stage reactor in series and repeating the process until all the reactant gases are consumed with overall conversion of over 95%. In this multi-stage reactor arrangement (plasma reactor followed by ammonia adsorption stage) initial ammonia capture, which also includes the adsorption of ammonia, is through a neutralisation chemical reaction between a base (ammonia) and acid (sulphonated PolyHIPE Polymer) which can take place at high temperatures above 100° C. (up to 200° C. before the polymer starts degrading). Since the product stream (ammonia+hydrogen+nitrogen+water) from the plasma reactor contains water, as a result of the reaction of hydrogen with the un-removed oxygen in nitrogen feed, sulphonated PolyHIPE Polymer will also adsorb water (up to 40 times but at least ten times of its own weight at room temperature) which in turn solubilises more ammonia thus increasing the ammonia holding capacity of sulphonated PolyHIPE Polymer. Chemical ammonia binding capacity of sulphonated PolyHIPE Polymer is further increased by using highly crosslinked and sulphonated polystyrene based polymers.

Prior art practice for removal of ammonia is to pass it through a suitable absorber such as water. The ammonia is dissolved in the water but introduces water vapour into the gas stream. Alternatively, ammonia and water are refrigerated to remove them as product. The present invention removes the need for drying the reactant stream. Drying is normally required because water acts as a temporary catalyst poison. Nevertheless, catalyst poisoning effect of water is less significant than that of oxygen, carbon monoxide and carbon dioxide which are present in the conventional method but absent in the present technique. The final product from the present technique is ammonium salt of sulphonated PolyHIPE Polymer with adsorbed free ammonia which can be recovered or neutralised with a suitable acid such as phosphoric or nitric acid to provide further amount of fertiliser within the pores of PolyHIPE Polymer. This product can be used as a fertiliser and soil conditioner as disclosed in PCT WO2010/040996. This fertiliser product also eliminates the explosion risk of the ammonium nitrate fertilisers and provides safe handling. It also changes the economics of ammonia production by significantly reducing production costs and producing a usable and easily handled fertiliser.

Preferred embodiments of the present invention will now be described, by way of example only, and not in any limitative sense, with reference to the accompanying drawings in which.

Figure 1:
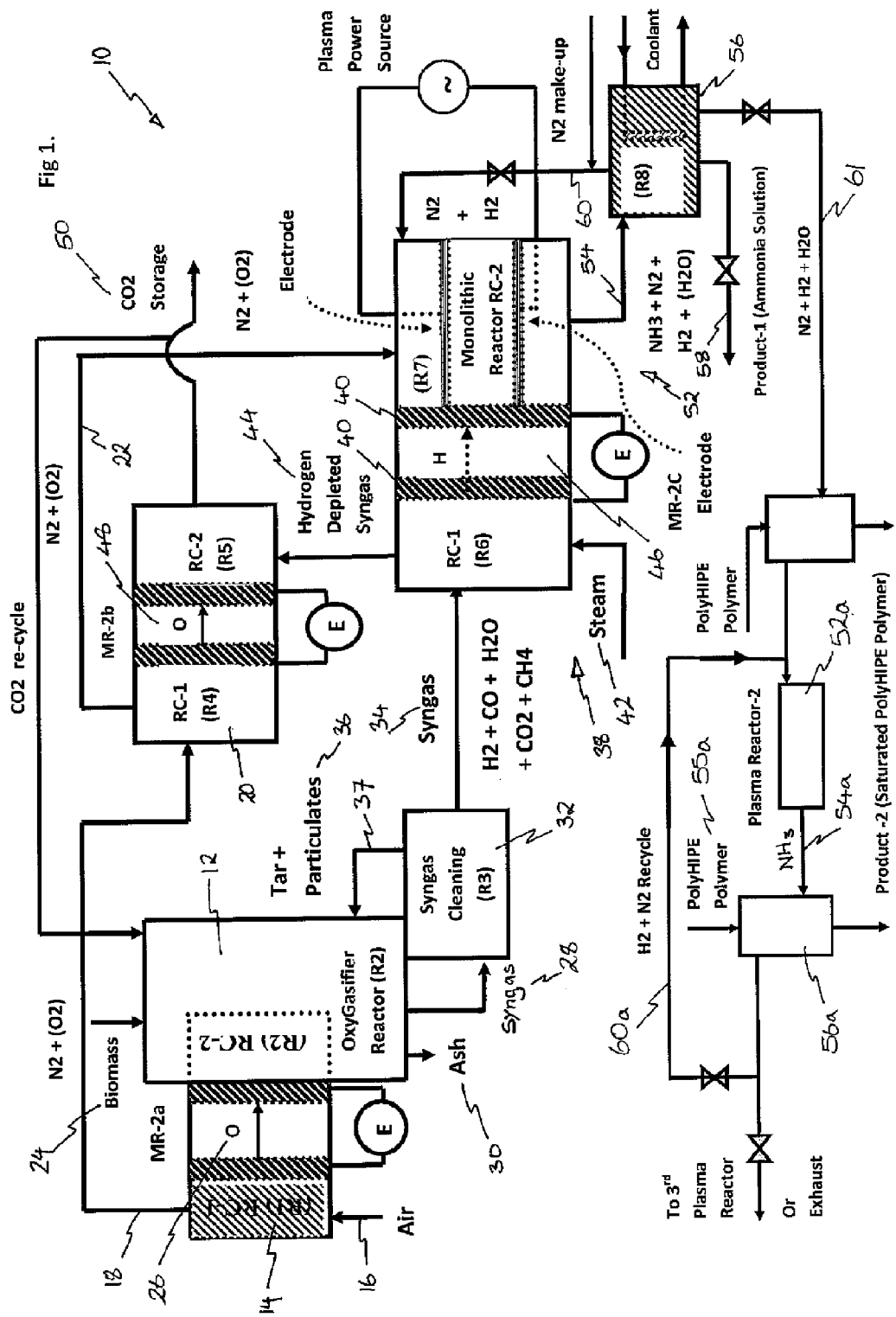
FIG. 1 is a schematic representation of a chemical plant of the present invention for producing ammonia.

Referring to FIG. 1, an ammonia production system 10 includes a gasifier 12 for the gasification of combustible material to produce syngas. The gasifier 12 has an oxygen removal system 14 that receives an airstream 16, extracts oxygen which is used in the gasification process and provides a nitrogen enriched airstream 18. The system 10 also includes a second oxygen removal system 20 that removes substantially all of the oxygen from the nitrogen enriched airstream 18 to produce a substantially oxygen-free airstream 22. Biomass 24 is input into the gasifier which is gasified with the oxygen 26 from the oxygen removal device 14 undertaking a standard gasification reaction to produce syngas 28 and ash 30.

The output syngas 28 is cleaned in syngas cleaning system 32 that produces cleaned syngas 34 and tar and particulates 36 that are fed back into gasifier 12 via input 37.

A hydrogen extraction device 38, including hydrogen selective membrane 40 sandwiched between two porous supports, receives the syngas 34 together with steam 42 to produce a hydrogen depleted syngas stream 44 and a hydrogen output 46. The hydrogen depleted syngas 44 is received in the second oxygen removal system 20 with the nitrogen enriched airstream 18 and are burnt to remove substantially all of any remaining oxygen. This produces a carbon dioxide output 50 and heat which is partially recycled back to the gasifier 12 and remainder of carbon dioxide is stored. The hydrogen output 46 from hydrogen extraction device in the form of hydrogen selective membrane 40 sandwiched between two porous supports is mixed with the substantially oxygen-free airstream 22 in a reaction device 52 that combines the nitrogen in the substantially oxygen-free airstream 22 and hydrogen from the hydrogen output 46 to produce ammonia in a reaction device output stream 54 that is directed to an ammonia recovery device 56. The reaction device output stream 54 contains the product (ammonia), together with unreacted nitrogen and hydrogen and trace quantities of water. The ammonia recovery device 56 removes the ammonia and water in an output stream 58 and recycles the remaining hydrogen and nitrogen stream 60 back into the reaction device 52.

In FIG. 1, the ammonia recovery operation 56 is in the form of refrigeration system. However, it can be replaced by any suitable product removal system including a gas cooling system followed by a packed bed of PolyHIPE Polymer for ammonia reaction with the acid form of the sulphonated PolyHIPE Polymer, which also adsorbs any remaining water. Unreacted moisture free nitrogen and hydrogen are either recycled back to the reactor 60 or preferably, these reactants are fed into a second plasma reactor 52a where further conversion takes place. In the first plasma reactor 52, the residual oxygen is removed as water when oxygen reacts with hydrogen. This operation ensures that the residual oxygen in the nitrogen stream is removed from the reaction stream using the product removal stage 56 and hence the water removal duty at this stage is high requiring low temperature operation. However, once the residual oxygen is removed, the product stream 61 is fed to a second plasma reactor 52a and the product ammonia 54a is removed in the packed bed 56a using a strong acid ion exchange resin such as sulphonated PolyHIPE Polymer 55a which can be removed after saturation 56a and stored. The unreacted nitrogen and hydrogen 61a are either fed in to the 3rd plasma reactor or recycled back 60a for complete conversion. In the second and subsequent plasma reactors, small amounts of water are produced through the reduction of hydrogen on the, for example Nickel oxide, catalyst.

Figure 2:
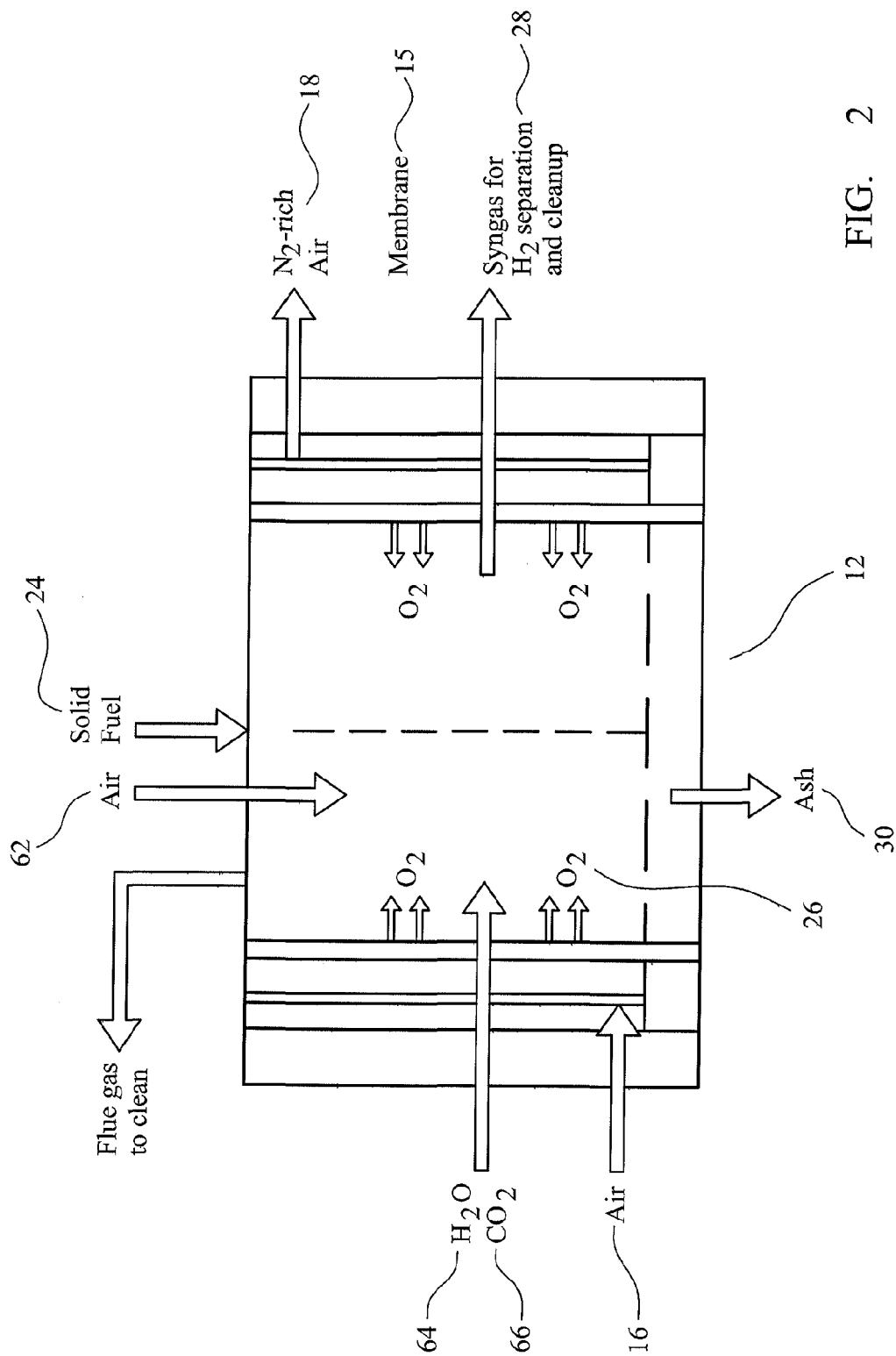
FIG. 2 is a schematic representation of a gasifier used in the present invention.

Referring to FIG. 2, this simplified and schematic representation of the gasifier 12 with oxygen input system receives inputs of solid biomass fuel 24 together with airstream 16 from which oxygen 26 is removed by an oxygen selective membrane 15. Further air 62, water 64 and $CO_2$ 66 are also provided as inputs to the gasifier 12. The outputs of gasifier 12 include ash 30, syngas 28 and a nitrogen enriched airstream 18.

Figure 3:
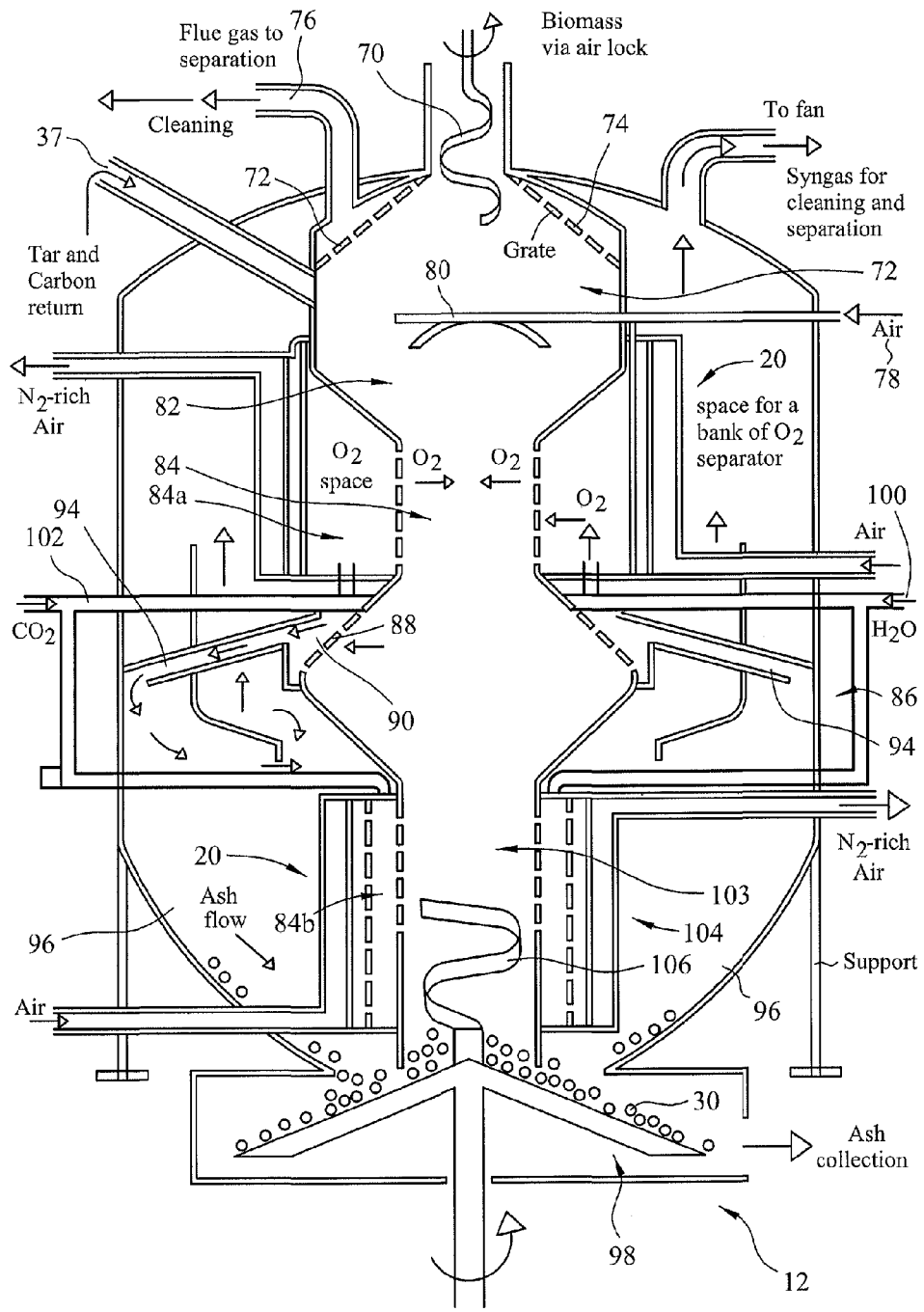
FIG. 3 is a schematic sectional view of a gasifier used in the present invention.
Figure 4:
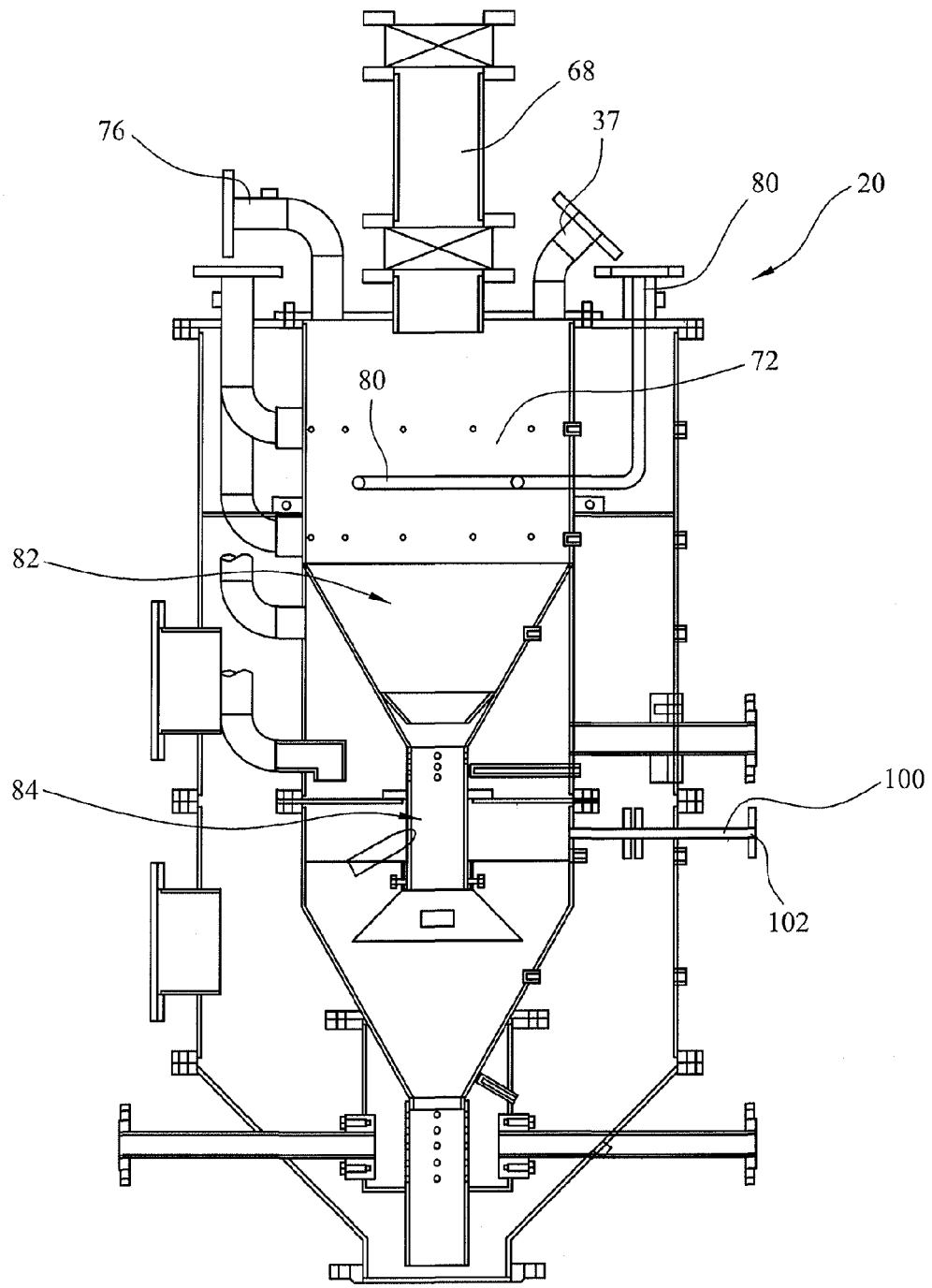
FIG. 4 is a sectional view of a gasifier used in the present invention.

Gasifier 12 is shown in greater detail in FIGS. 3 and 4, in which a feed zone 68 receives biomass 24 via an airlock (not shown). The biomass 24 is fed into the gasifier 12 using a feed screw 70 although the feed screw can be withdrawn if the fuel feed is able to operate continuously under gravity. As the biomass fuel 24 moves downwards, hot combustion gases from the combustion zone 72 heats the biomass fuel and remove moisture from the fuel. Gases from the combustion zone 72 are primarily nitrogen and carbon dioxide, the exhaust gases, which must be cleaned before being discharged to the atmosphere. The gases from the feed zone 68 and combustion zone 72 leave the gasifier through perforated grates 74 via exhaust 76 and a flue gas cleaning unit (not shown).

In the localised combustion zone 72, the dried and heated biomass fuel is combusted using heated air 78 that enters the combustion zone via manifold 80. Complete combustion is confined to a small central zone so as to create sufficient energy for heating the biomass to around 400 to 500° C., just below the pyrolysis temperature. The fuel feed and combustion rates in the localised combustion zone 72 are adjusted so that the gases leaving the feed zone 68 and combustion zone 72 remove all of the nitrogen and syngas generated by the localised combustion.

The purpose of this localised combustion zone and syngas/flue gas recovery 78 from this zone is three fold:
1) It provides the necessary initial temperature rise in the gasifier so that the oxygen selective membranes can operate.
2) Since large amounts of tars are generated at the beginning of gasification, they are likely to deposit on catalytic parts of the gasifier including the oxygen selective membranes.
3) If bridging occurs during gasification when syngas quality decays, syngas uptake is switch to the flue gas outlet 76 from the top of the gasifier. This method ensures that syngas quality is not compromised and the bridge is broken without having to use physical methods.

Below the localised combustion zone 72 are located the pyrolysis zone 82 and oxidation zone 84. The top of the pyrolysis zone 82 is filled with hot biomass ready for pyrolysis through the heat radiated from the oxidation zone 84. Part of the heat necessary for the pyrolysis to take place in the pyrolysis zone 82 is provided by convection of the gases generated in the oxidation zone 84 as some of the gases are drawn towards the exhaust vent 76.

Oxygen 26 is introduced into the oxidation zone 84 and contacts with the char and pyrolysis gases to create sufficient energy for gasification, raising the temperature to around 1300 degrees C. Some syngas is allowed to pass into the pyrolysis section 82 and then the localised combustion zone 72 where it is partially oxidised to produce heat. Once sufficient oxygen is taken in for gasification, flue gas outlet is shut and the high quality syngas is taken up from the syngas outlet 28 connected to the syngas fan.

Below the oxidation zone is the reduction and syngas conditioning zone 86. Syngas produced in the oxidation zone 84 passes through a perforated grate 88 and into manifold 90 where it is split into at least four but preferably sixteen or more streams using a vortex generator 92, shown in FIG. 6. Vortex arms 94 are small diameter pipes extending from the manifold and expand allowing particulate matter and tars to fall from the syngas stream as they exit the vortex arms. These particulates and tar are caught by ash collection surface 96 where they can join other ash in the ash removal zone 98 or can be recycled for further gasification via input 37. The vortex arms 94 are inclined downwards, at approximately 30 degrees, to prevent ash and tar accumulation and to provide inertia in a vertical direction for the ash particles, thus enhancing separation. Furthermore, the exits of the vortex arms are profiled so that the emerging gases from one arm do not impinge on the back of the next vortex arm.

Figure 6:
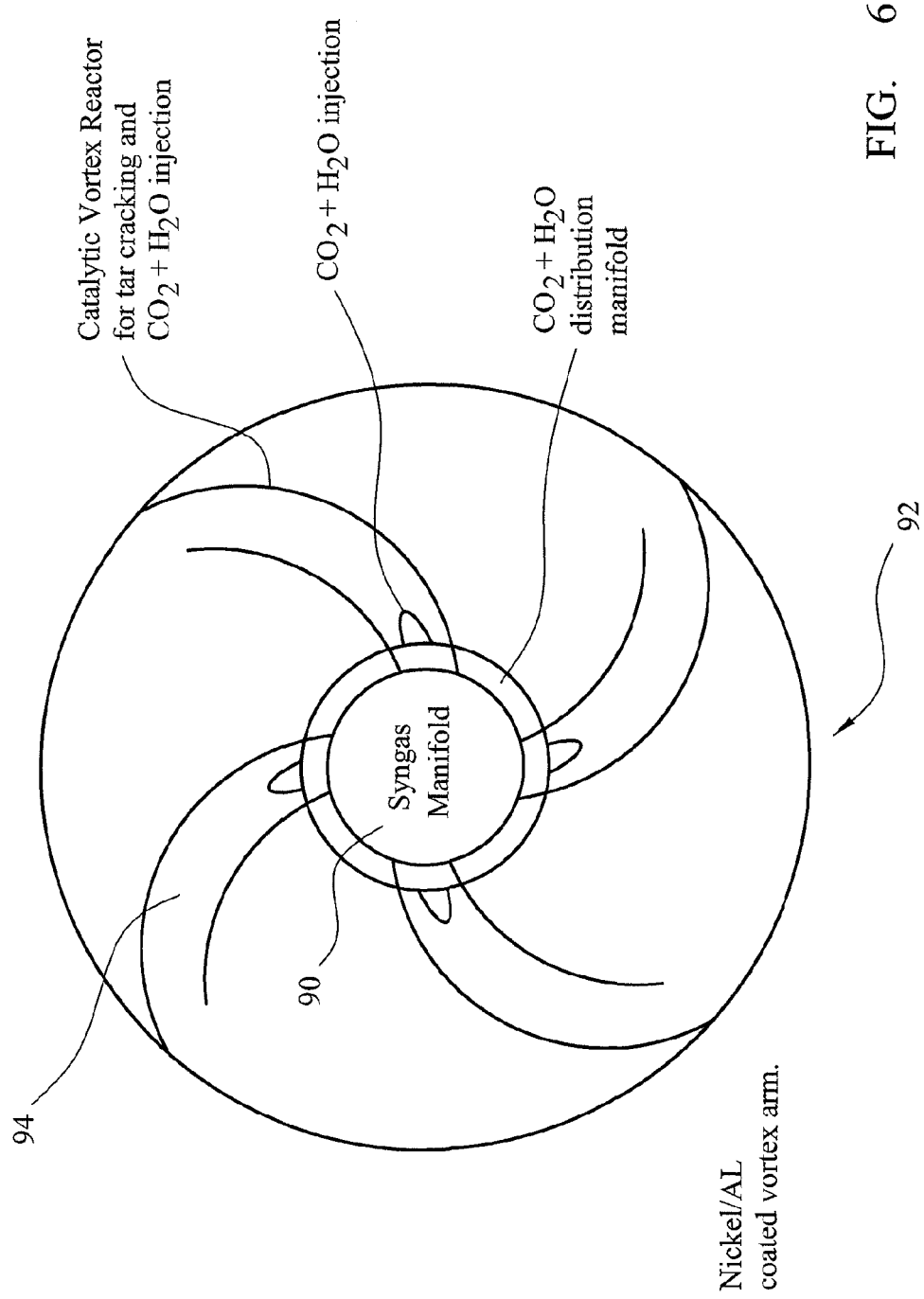
FIG. 6 is a plan view of a portion of the gasifier used in the present invention.

In order to shift the reaction equilibrium towards generation of hydrogen through the endothermic reactions of syngas production (as set out in the equations below) a mixture of water 64 and carbon dioxide 66 are injected into the vortex arms at 100 and 102 respectively. The inside of the vortex arms 94 are coated with a catalyst, which is preferably nickel. Alternatively, the vortex arms can be made from perforated metal behind which a suitable catalyst is packed. The perforated metal protects the catalyst and the presence of steam helps prevent carbon deposition as well as acting as a hydrogen source. The vortex arms 94 are preferably made in two parts and further preferably with rectangular cross-sections so that they can be readily assembled and serviced for catalyst removal and regeneration. In FIG. 6, only four vortex arms 94 are shown in a column plane. However, several layers of vortex arms can be used to increase the catalyst surface area with the following reaction taking place.

Reactions Involving Water

| | | |
|---|---|---|
| $C_nH_x + nH_2O \rightarrow$ | $(n + x/2)H_2 + nCO$ | |
| $CH_4 + H_2O \rightarrow$ | $3H_2 + CO$ | $\Delta H_{298} = +205.81$ kJ/mol |
| $C_2H_4 + H_2O \rightarrow$ | $4H_2 + 2CO$ | $\Delta H_{298} = +210.07$ kJ/mol |
| $CO + H_2O \rightarrow$ | $H_2 + CO_2$ | $\Delta H_{298} = -41.16$ kJ/mol |
| $C + H_2O \rightarrow$ | $H_2 + CO$ | $\Delta H_{298} = +131.29$ kJ/mol |

Reactions Involving $CO_2$ Conversion

| | | |
|---|---|---|
| $C_nH_x + nCO_2 \rightarrow$ | $(x/2)H_2 + 2nCO$ | |
| $CH_4 + CO_2 \rightarrow$ | $2H_2 + 2CO$ | $\Delta H_{298} = +246.98$ kJ/mol |
| $C_2H_4 + 2CO_2 \rightarrow$ | $2H_2 + 4CO$ | $\Delta H_{298} = +292.41$ kJ/mol |
| $CO_2 + H_2 \rightarrow$ | $CO + H_2O$ | $\Delta H_{298} = +41.16$ kJ/mol |
| $CO_2 + C \rightarrow$ | $2CO$ | $\Delta H_{298} = +172.46$ kJ/mol |

Injection of $CO_2$ and water into the oxidation zone is also important to lower the temperature in this zone since due to the use of oxygen as oxidant will increase the wall temperature to unacceptable levels in a gasification operation with implications on the materials of construction and melting of some of the inorganic compounds present in syngas (see for example, C. A Jordan and G Akay, Speciation and distribution of alkali, alkali earth metals and major ash forming elements during gasification of fuel cane bagasse, Fuel, 2011, in press)

In order to reduce the gasifier wall temperature, water or carbon dioxide should be injected into the oxygen space in the oxidation zones, 84a and 84b through a split stream from the carbon dioxide inlet 102 and water inlet 100.

Below the first oxidation zone 84 and reduction and syngas collection zone 86 is the second oxidation zone 103 where oxidation of the remaining fuel takes place and the ash collection zone 104 where heavy particles travel down and form a seal around a feed screw 106. Further oxidation takes place in the second oxidation zone 103 by the introduction of further oxygen 26 creating more energy into the reduction zone. The resulting oxidation products travel upwards into the first oxidation zone 84 and eventually taken-up by the syngas exit 28 via the reduction zone 94. The remaining ash 30 is drawn down with feed screw 106 before it is removed via ash removal zone 98.

Figure 5:
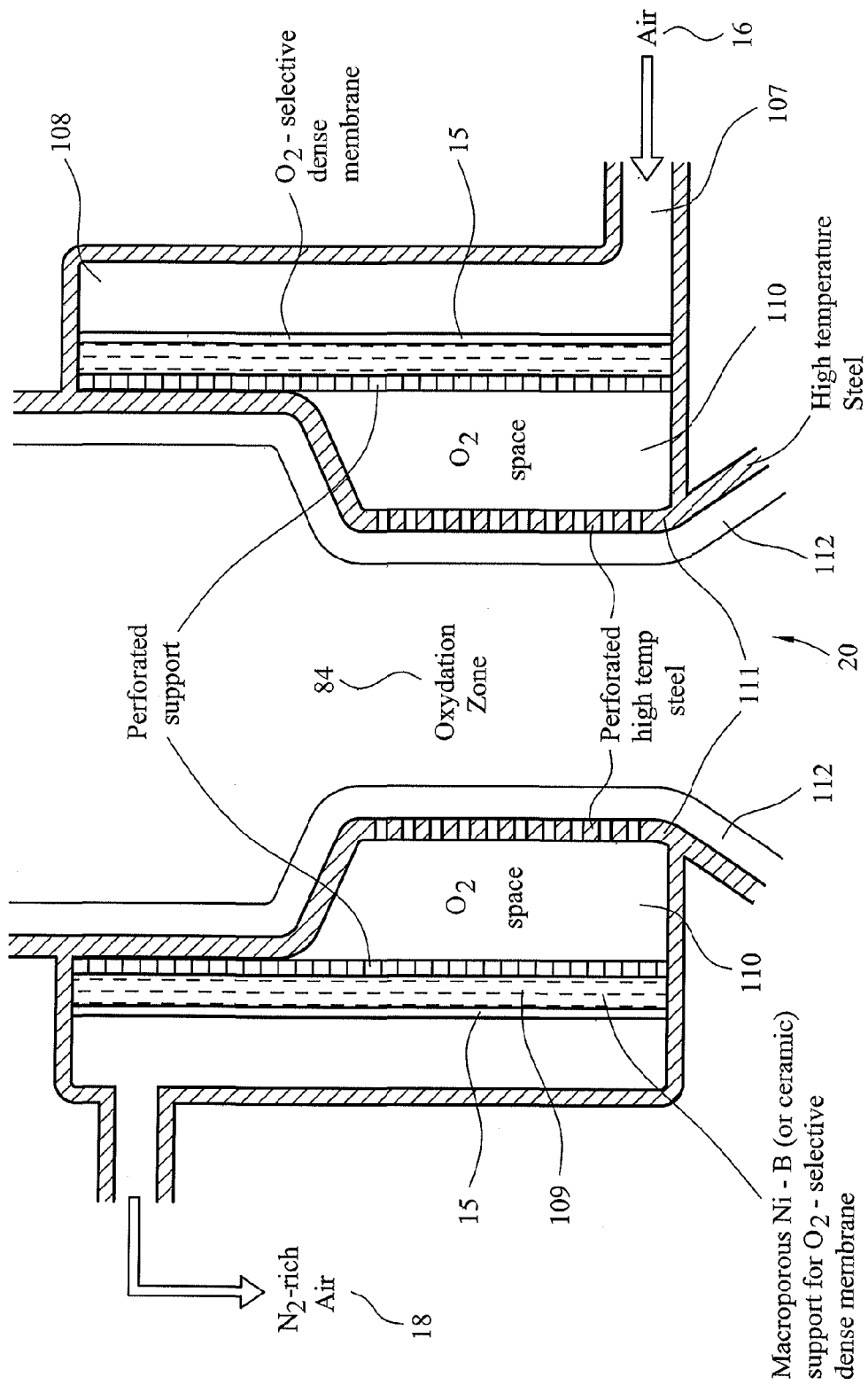
FIG. 5 is a sectional view of an air input system used in a gasifier of the present invention.

The introduction of oxygen 26 in the first oxidation 84 and second oxidation zones 103 is undertaken using an oxygen removal system shown in FIG. 5. An airstream 16 enters the oxygen removal system 20 though air input 107 and passes into an annular chamber 108. Radially inward of this chamber 108 is an oxygen selective membrane 15 which is supported by a macroporous nickel-based or ceramic support 109. The macro-porous support is preferably Nickel-Boron or Nickel foam which is preferably in turn supported by a perforated support formed from porous nickel which also acts as sacrificial catalyst and is located further away from the membrane than the first catalyst layer, which is generally immediately adjacent the membrane. Oxygen is selectively passed through the membrane and in turn through the macroporous support and perforated support to enter an annular oxygen-rich space 110. A perforated high temperature steel casing 111 separates the oxygen-rich space 110 from the oxidation zone 84 and this steel may preferably be protected with a perforated high temperature ceramic lining 112. Examples of the oxygen selective dense membranes include mixed oxides $BaCo_{(0.4)}Fe_{(0.6-x)}Zr_{(x)}O_{(3-\delta)}$ where x=0-0.4, and $\delta$ is the oxygen nonstoichiometry in perovskite-type oxides or $SrCe_{(0.95)}Yb_{(0.05)}O_{(3-\delta)}$.

Oxygen transfer across the membrane 15 is enhanced by the presence of the oxidation reaction taking place in the oxidation zone 84 as a result of the very large chemical potential for oxygen diffusion. However, exposure of the oxygen selective membrane 15 to the high temperatures of the oxidation zone 84 may physically and chemically damage the membrane. As a result, the protective layers are provided. In order to protect the macroporous metallic or ceramic support, this membrane system is sealed. Sealing is achieved by using high temperature commercial ceramic sealants which are administered after the membrane is sandwiched in a membrane holder. On the combustion side, the sandwiched sealed membrane module contains sacrificial porous catalyst.

With oxygen removal taking place, a nitrogen-rich airstream 18 is produced. An oxygen removal system similar to that shown in FIG. 5 is used adjacent the oxidation zone 103 to introduce further oxygen to further oxidise the ash before passing into the ash collection zone 104. The introduction of water to the oxygen space 84b is required to prevent excessive increase in the wall temperature.

Figure 7:
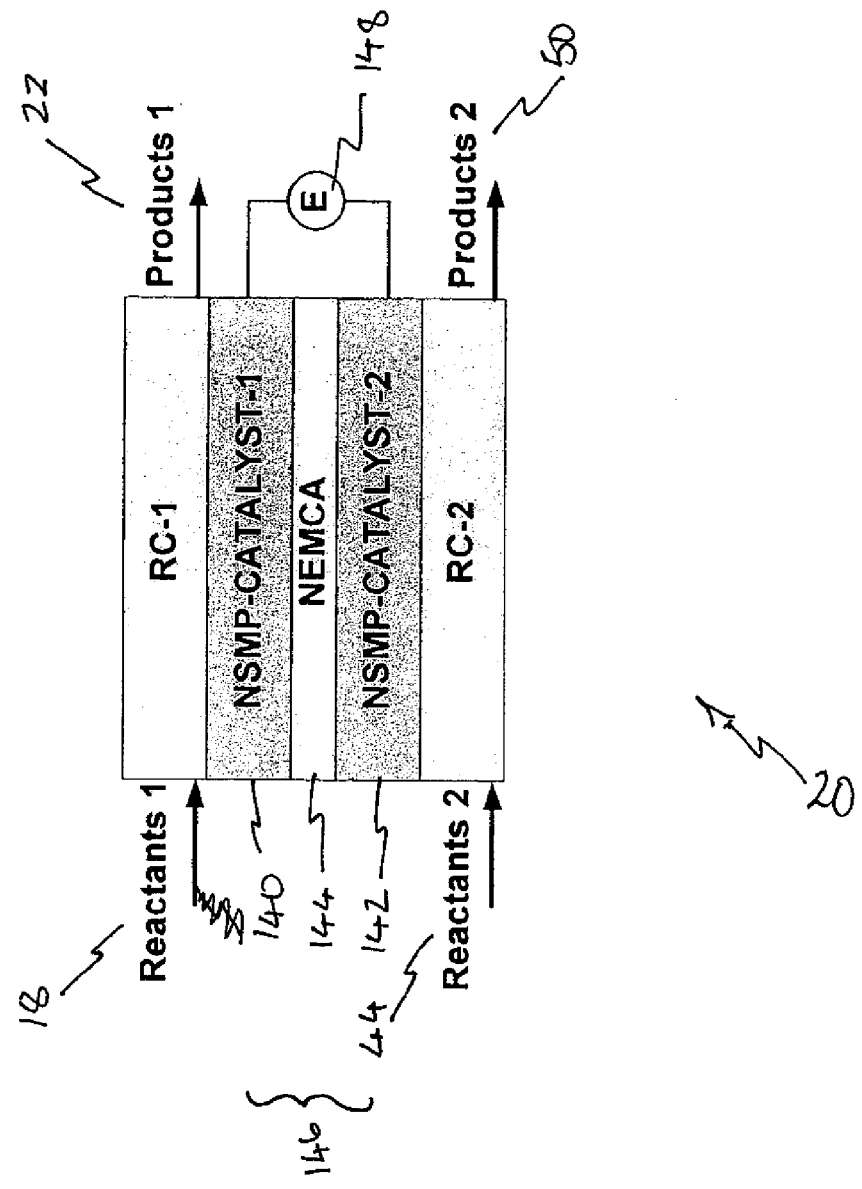
FIG. 7 is a schematic representation of an oxygen removal system used in the present invention.

With reference to FIG. 7, further oxygen is removed from the Nitrogen enriched air stream 18 in oxygen removal system 20. The system 20 is designed for reduced temperature and pressure applications and illustrates the hybrid microreactor concept. The system 20 is in the form of two catalytic nano-structured macro-porous plates 140 and 142 separated by a dense Non-Faradaic Electrochemical Modification of Catalytic activity (NEMCA) membrane 144 thus forming a sandwich 146. These sandwiched NEMCA membranes are either hydrogen or oxygen selective but need not be confined to these two gases. Its permeability is enhanced by the application of electric field across the catalytic plates which also act as electrode, from power source 148.

Although the ammonia reaction is exothermal, the rate determining stage is the dissociation of nitrogen molecule to reactive nitrogen atoms or high energy species. Plasma can achieve nitrogen dissociation but the immediate reaction of reactive nitrogen species with hydrogen should be facilitated. This is achieved by creating the plasma within the close proximity of the catalyst. The catalyst itself should be highly porous so that the reactive species can diffuse to the reactive sites fast before being deactivated.

Figure 9:
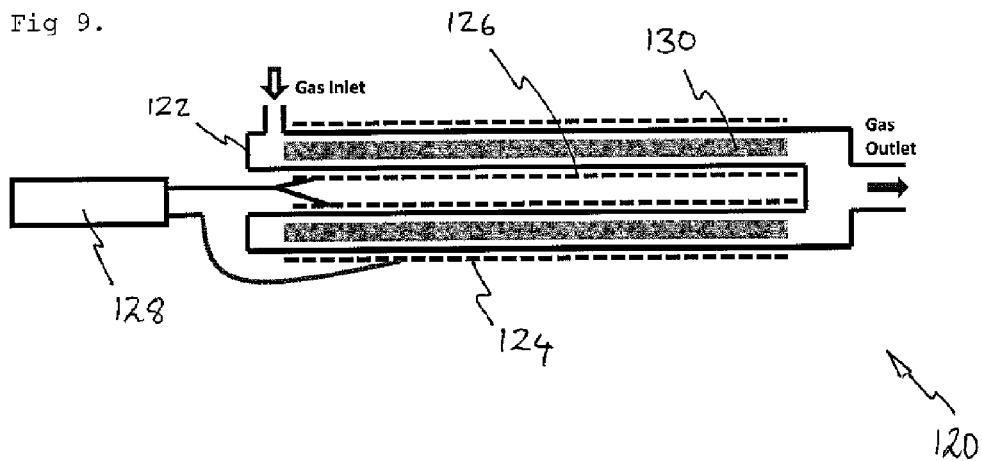
FIG. 9 is a schematic representation of a plasma reactor of the present invention.
Figure 10:
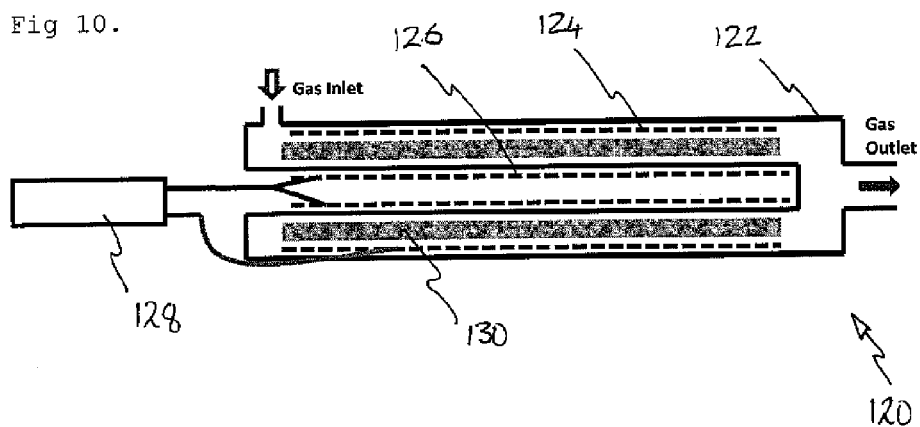
FIG. 10 is a schematic sectional representation of another plasma reactor of the present invention.
Figure 11:
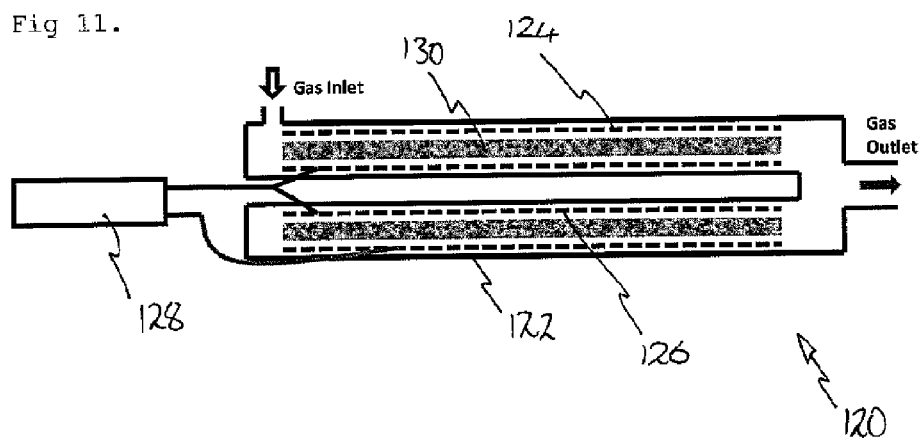
FIG. 11 is a schematic sectional representation of a further plasma reactor of the present invention.

In order to provide such catalytic reactors, there are three different possible electrode configurations. These different options are dependent on the dielectric constant of the catalysts. Most heterogeneous catalysts are supported with a high surface area material such as alumina or silica which have relatively high dielectric constant. However, the catalyst itself is highly conductive with low dielectric constant and hence the supported catalysts will act as conductors which cause the decay of plasma. Therefore, for supported catalysts or catalysts in general, the electrode configuration in plasma reactors is restricted depending on the dielectric constant of the catalyst system. Hence the electrode configurations available are:

a) As shown in FIG. 9, both electrodes are separated from the catalyst through a dielectric barrier which allows electrically conductive catalysts in the plasma discharge space. However, the generation of plasma requires high electrical energy input.

b) As shown in FIG. 10, one electrode is in contact with the catalyst while the second electrode is behind a dielectric barrier which allows plasma generation at lower electric energy input provided the catalyst is coated with a high dielectric constant material. In this case, plasma is generated on the coated catalyst particles.

c) As shown in FIG. 11, both electrodes are in contact with the catalyst coated with high dielectric constant barrier. Plasma generation is achieved even lower electric energy input and the plasma is generated on the catalyst coating.

Referring to FIGS. 9, 10 and 11, a plasma reactor 120 is provided as a reaction device 52 for converting nitrogen and hydrogen into ammonia. The plasma reactor 120 includes a vessel 122, a ground electrode 124 and high voltage electrodes 126 that are powered from a high voltage supply 128. Also contained within the vessel 122 is a catalyst 130. This catalyst is coated with an electrically insulating material thereby preventing shorting between the ground electrode 124 and high voltage electrodes 126. Vessel 122 is preferably tubular with an outer tubular portion 122a and an inner tubular portion 122b forming a quartz or ceramic sheath.

A mixture of hydrogen and nitrogen enters the vessel at a gas inlet. Plasma forming within the vessel initiates the reaction between nitrogen and hydrogen to produce ammonia which passes out of a gas outlet together with unreacted nitrogen and hydrogen. It should also be notes that only a small amount of catalyst is required to promote the production of ammonia. As a result, the coated catalyst particles can be mixed with other particles that reduce the total quantity of catalyst required. For example Barium titanate balls can be included in with the coated catalyst.

Figure 12:
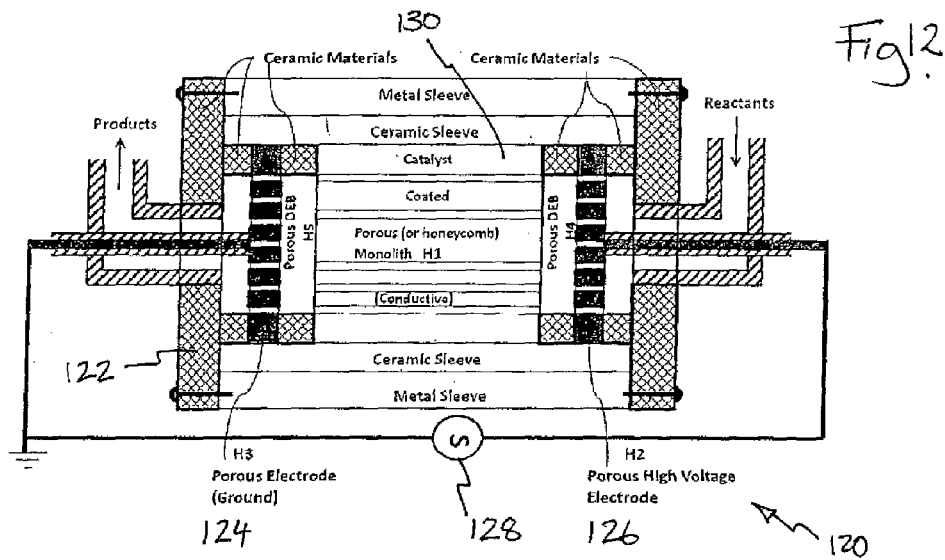
FIGS. 12 and 13 are schematic representations of further plasma reactors of the present invention.
Figure 13:
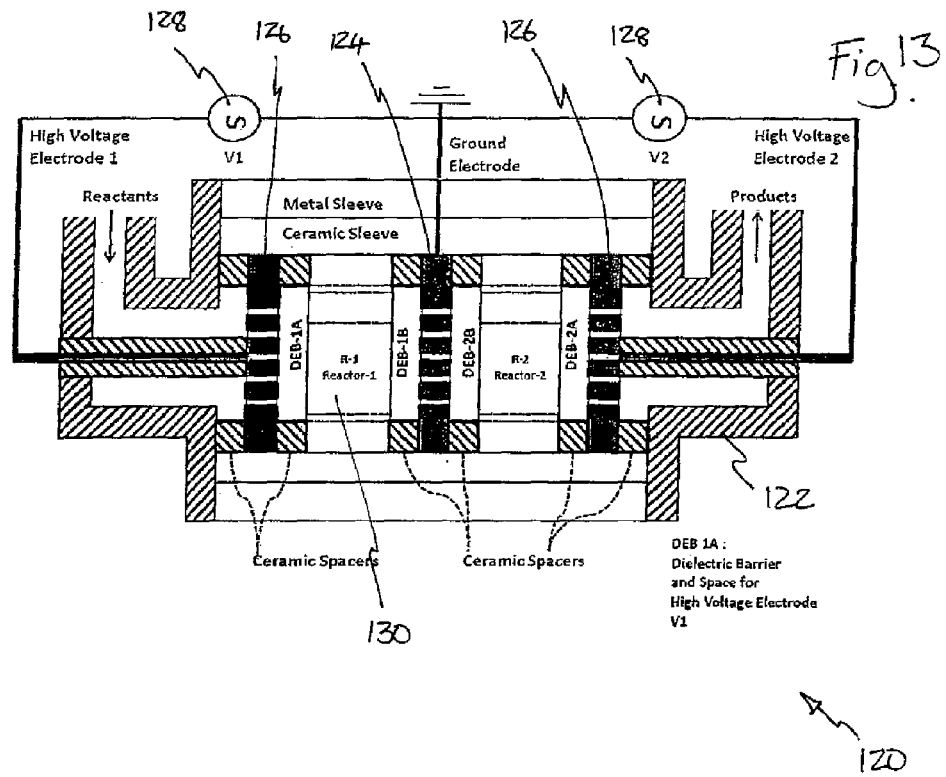

In FIG. 9 both the ground and high voltage electrode are outside of the vessel. In FIG. 10 one of the electrodes is contained within the vessel and in FIG. 11 both electrodes are within the vessel. In the alternative embodiment shown in FIG. 12, the electrodes are provided at either end of the vessel rather than running axially along the cylindrical vessel. In a further alternative shown in FIG. 13, non-axial electrodes are also used as a series of alternating porous electrodes.

Figure 8:
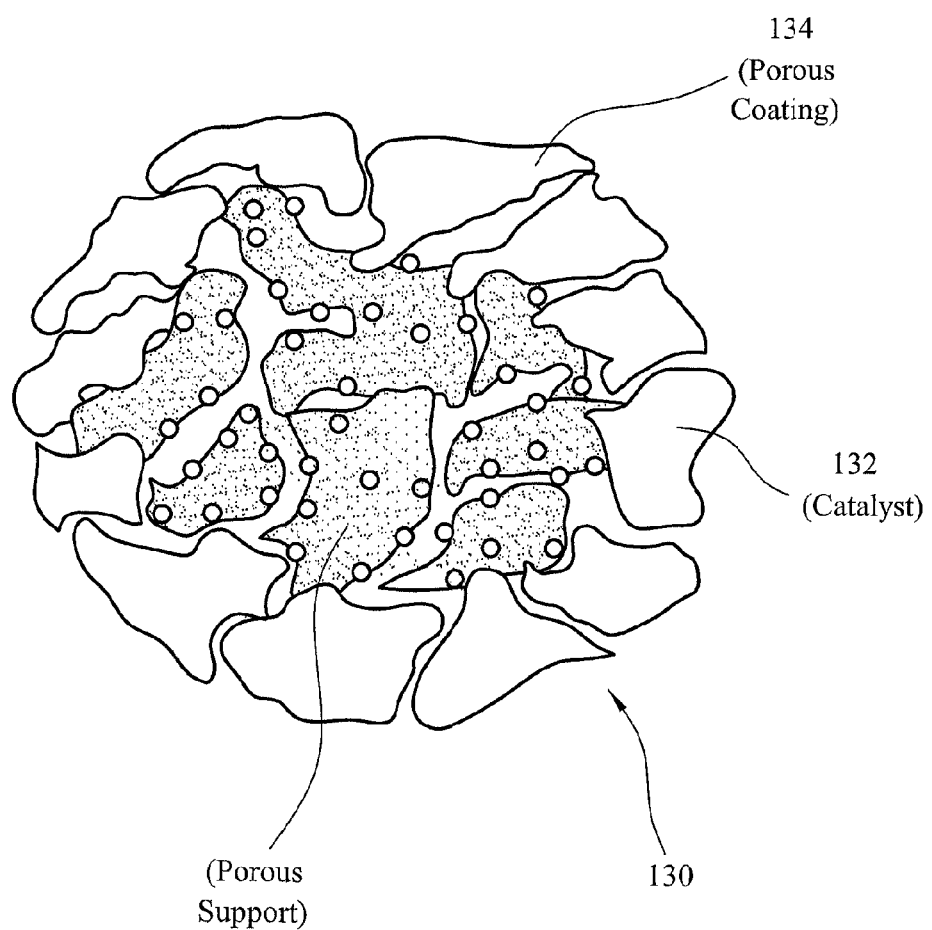
FIG. 8 is a schematic sectional view of a catalyst of the present invention.

Referring in addition to FIG. 8, the coated catalyst 130 is formed from a catalyst body 132 that is coated with a porous coating 134. The coating is preferably electrically insulating allowing the catalyst to be placed between to electrodes without the risk of shorting. The coating may be a silica coating or alternatively could be a high temperature and dielectric constant material such as Calcium oxide, or Barium oxide or Barium titanate Preferably the dielectric constant or permittivity of the coating should be at least 10, more preferably at least 100 and ideally at least 1000. The porous dielectric barrier coating for the catalyst can also have catalytic action itself thus enhancing both the rate of reaction, yield and selectivity. Suitable coating materials for this purpose are shape and size selective zeolites and pervoskites type mixed oxides.

Barium titanate is preferably used since it has a very high dielectric barrier and encourages the forming of plasma which takes place in close proximity to the catalyst thereby promoting the dissociation reaction of nitrogen on the catalyst surface so that the activated nitrogen species can react with hydrogen to form ammonia before these activated species decay to reform their stable molecules.

EXAMPLES

In the catalytic plasma synthesis of ammonia and its recovery, the following steps are undertaken: a) Preparation of solid acid and water adsorbents which are eventually used as synthetic rhizosphere in soil to promote plant growth; b) Preparation of structured catalysts with an hierarchy of pores and high surface area suitable for use in plasma reactors; c) High dielectric constant catalysts for use in plasma reactor with at least one electrode in contact with the catalyst; d) Plasma reactor configurations to maximise ammonia yield and minimise energy consumption. The following examples are provided illustrating these steps.

Example A

Preparation of PolyHIPE Polymers for Ammonia and Water Adsorption and Formation of Synthetic RhizoSphere (SRS) Media and Slow Release Fertiliser Materials for the Preparation of Synthetic Rhizosphere (SRS)-Media Polymers All chemicals were reagent grade. Monomer (styrene), cross-linking agent (divinyl benzene, DVB), polymerization initiator (potassium per sulphate), sulphonation agent (0.97 g sulphuric acid/gram solution), were all supplied by Aldrich.

Preparation on Synthetic Rhizosphere Media Polymers

The SRS-Media polymer is a nano-structured crossed linked hydrophilic elastic ionic micro-porous material, generically known as PolyHIPE Polymers (PHPs) which are prepared through a High Internal Phase Emulsion (HIPE)

polymerization and subsequent functionalization route as disclosed by Akay et al. U.S. Pat. No. 7,820,729. The preparation of functionalised PHPs has 3 stages 1) Stable HIPE formation; 2) Polymerisation and 3) Functionalization.

Preparation of High Internal Phase Emulsions

Composition of Phases

The aqueous phase of HIPE consists of deionised water, an initiator of polymerisation (potassium persulphate) and 0.05 g sulphuric acid/g solution as the nano-structuring agent. Volume fraction of aqueous phase (phase volume) was 0.90. Oil phase of HIPE consists of monomers, cross-linking agent, non-ionic surfactant and oil-phase initiator (such as lauryl peroxide, usually at 2 wt % of oil phase) when the resulting polymer is used in catalyst applications. Oil phase composition is:

Weight fraction of styrene in the oil phase=0.76 (g styrene/g oil phase),
Cross-linking agent (divinyl benzene, DVB)=0.1 g DVD/g oil phase,
Non-ionic surfactant (sorbitan monooleate, Span 80)=0.14 g surfactant/g oil-phase.

Emulsification

The components of the oil phase were mixed together at room temperature. The aqueous phase was also prepared at room temperature. The emulsification was carried out at room temperature in a closed vessel. The oil phase was placed into the mixing vessel (internal diameter 12 cm) just before the start of the emulsification and then the aqueous phase was dosed into the oil phase, via a peristaltic pump into the mixing vessel, whilst mixing which was achieved via 3 flat paddles (9 cm diameter), stacked at right angles. Bottom impeller was as close to the bottom of vessel as possible and the other impellers are spaced so that when all of the aqueous phase was dosed, the top impeller was immersed 1 cm below the emulsion surface. Dosing of the aqueous phase into the mixing vessel was conducted from the top of the vessel in such a way that the aqueous phase fell as a film on the vessel wall so that the impingement of the liquid did not create a jet mixing. The dosing time was 5 min and the impeller speed was 300 rpm during dosing. After the completion of dosing, the emulsion was homogenised by mixing for a period of 1 min at 300 rpm impeller speed. Volume of the oil phase was 25 ml and that of the aqueous phase was 225 ml.

Polymerization of HIPE to Obtain PolyHIPE Polymers (PHPs)

Styrene monomer high internal phase emulsion was polymerized at 60° C. for 8 hours in sealed polypropylene cylindrical tubes (2.3 cm diameter). The presence of small amount of sulphuric acid creates instability which is however not sufficient to cause full phase separation. This instability causes nano-structure formation in the walls of PHP during polymerisation. After polymerization, it was functionalized. High water adsorption capacity and elasticity are required in the present application. Elasticity is achieved by swelling upon water adsorption when cross-linked polystyrene is transformed into highly hydrophilic polymer by sulphonation. Upon the removal of water, sulphonated PHP recovers its original rigidity. After polymerization, PHP samples were cut into 4 mm thick disks (which swell to 5 mm during sulphonation and subsequent water adsorption) and they were then washed with distilled water for 2 hours in excess water while changing water twice. Then PHP disks were dried in a fume cupboard for 24 hours before sulphonation.

Functionalization of PolyHIPE Polymers: Sulphonation and Neutralisation

After polymerisation, washing and air drying as described above, polymer disks were soaked in 97 g sulphuric acid/g solution for a period of 2 hours and then irradiated with microwaves using a Panasonic kitchen microwave oven (1000 W). However, microwave ovens are well known for their irregular distribution of irradiation, which usually results in the development of hotspots within the sample. Hotspots can lead to charring of the polymer, so as a quality control measure, the samples were irradiated at intervals of 30 seconds after which the discs were allowed to cool for 60 seconds and were turned upside down and randomly distributed into new positions on the microwave dish. Irradiation was continued until total irradiation time was typically 150 seconds for 14 discs, by which time the polymer had swelled into a soft, spongy structure. Under these conditions, the degree of sulphonation was ca. 70%. Prolonged sulphonation does not enhance degree of sulphonation but increases elemental carbon formation. Therefore, this irradiation time at this power rating was found to be optimum. It is also possible to sulphonate using just 0.1 g sulphuric acid/g aqueous phase solution but the water uptake capacity of these PHPs is lower. After sulphonation, PHP samples were washed thoroughly with water to remove excess acid. These polymers were dried, cut into cubical pieces measuring approximately 5×5×5 mm (volume ca. 125 mm$^3$) and stored for ammonia and water adsorption at 30° C. Water uptake capacity of these materials is approximately 18 fold of their own weight. At 30° C., solubility of ammonia in water is 0.4 g ammonia/g water. Therefore, by using PHP already containing water at 10 g water/g PHP level, the adsorption capacity of PHP increases to 4 g ammonia/g PHP. When PHP is saturated with ammonia, it is neutralised by using suitable acid such as nitric (to enhance nitrogen content) or phosphoric acid for use as fertiliser.

Example B

Nano-Structured Micro-Porous Supported Catalyst Preparation

Prior art in the preparation of supported metal catalysts uses particulate porous support such as oxides of aluminium ($Al_2O_3$; alumina) or silicon ($SiO_2$; silica). The aqueous solution of metal catalyst precursor salts such as nitrates of nickel, cobalt, iron, ruthenium are used to impregnate the support and the resulting system is heat treated at elevated temperatures (typically 600° C.) to decompose the catalyst precursor salt to obtain metal oxide which is then reduced at similar temperatures to reduce the metal oxide to active metal catalyst.

We discovered that, instead of using porous solid catalyst support, high surface area supported catalysts can be obtained by using stabilised nano-size support particles dispersed in water which also accommodates the catalyst precursor salt (such as $Ni(NO_3)_2$) since nitrates of such catalytic metals are highly soluble in water. Therefore, the resulting solution ensures that the catalyst distribution is uniform across the support at nanometer scale.

We also discovered that by promoting rapid boiling of the [catalyst precursor salt and stabilised catalyst support] solution in which liquid films are formed, we achieve the decomposition of the catalyst precursor salt to metal oxide at temperatures 250-300° C. which results in the formation of nano-structured micro-porous mixed metal oxide flakes with surface area typically over 200 m$^2$/g. Gas evolution during the decomposition of metal nitrate results in the formation of nano-pores and as the gas expands, larger pores are also formed during the collapse of the films formed as a result of boiling. These mixed oxides ($SiO_2$ and metal catalyst oxide, $M_xO_y$, x,y=1-3) have an hierarchy of porosity ranging from tens of micrometer to a few nanometers. The size of catalyst clusters is typically in the range of 2-20 nm depending on the processing conditions as well as the composition of the supported catalyst system.

In a further discovery, we found that microwave irradiation of the [catalyst precursor salt and stabilised catalyst] solution is very effective for the formation of the nano-structured micro-porous mixed oxide of $SiO_2$ and $M_xO_y$, (M=Ni, Co, Cu, Fe etc or their mixture) as it causes rapid evaporation of the aqueous phase when it forms liquid film. Containers in which the boiling occurs during microwave irradiation should preferably be in the form of round bottom flasks or watch-glasses in order to promote film formation and decomposition of the catalyst precursor salt.

As the concentration of catalyst precursor salt in the solution containing the support material (i.e., $SiO_2$) increases, the required power of the microwave radiation also increases. During microwave irradiation, if the power input is low, the evaporation of water takes a long time before the onset of decomposition of metal salt. However, if the power is not sufficiently high, although water evaporation is completed, the decomposition process may not start until the temperature exceeds ca. 300 C.

Preparation of Supported Catalyst Precursor Solution

The surface modification of silica ($SiO_2$) particles or indeed inorganic materials is well known in the literature. This modification allows the formation of stable silica dispersions at high silica concentrations. Such silica dispersions are available commercially, for example they are manufactured by AkzoNobel under the trade name Bindzil. Throughout this study, Bindzil CC30 (epoxy functional methoxysilane modified silica dispersion in the form of clear solution containing 30 wt % silica, with particle size of 7 nm) was used. Other grades of Bindzil include 40 wt % silica loading with silica size of 20 nm (Bindzil CC40) or epoxy functional ethoxysilane modified silica with 30 wt % silica with particle size of 7 nm (Bindzil CC301)

Appropriate amount of catalyst precursor salt was directly added into the catalyst support dispersion/solution (Bindzil 0030) so that the desired molar ratio of catalyst and support [M/S] is obtained. If the solubility of the catalyst precursor salt is low (such as Barium or Lead) it is necessary to dilute the Bindzil solution so that all the catalyst precursor salt is dissolved. After the preparation of this supported catalyst precursor solution, it is subjected to 4 different methods of catalyst precursor salt decomposition to obtain different types of supported catalyst oxides which is then reduced using hydrogen before being used in catalytic reactions. Below, these methods of catalyst oxide formation are summarised as examples of the method.

We used Nickel supported by $SiO_2$ as catalyst for ammonia synthesis at molar ratio of [Ni]/[Si]=1/4. Therefore the supported catalyst precursor solution was obtained by dissolving 290.8 g Nickel(II) nitrate hexahydrate in 801.2 g Bindzil CC30 which contains 240.4 g Silica. We also prepared stock solutions to obtain [Ni]/[Si]=1/2; 1/3; 1/5.

Example B-1

Catalyst Preparation Through High Internal Phase Emulsion Polymerisation

A high internal phase emulsion (HIPE) was formed by using an oil phase which contains:
Divinylbenzene, DVB (cross-linking agent)=28 wt %
SPAN 80 (surfactant)=10 wt %
Vinyl trimethoxy silane (VTMS, co-monomer)=30 wt %
Styrene=30 wt %
Lauryl peroxide (oil phase initiator)=2%

Figure 14:
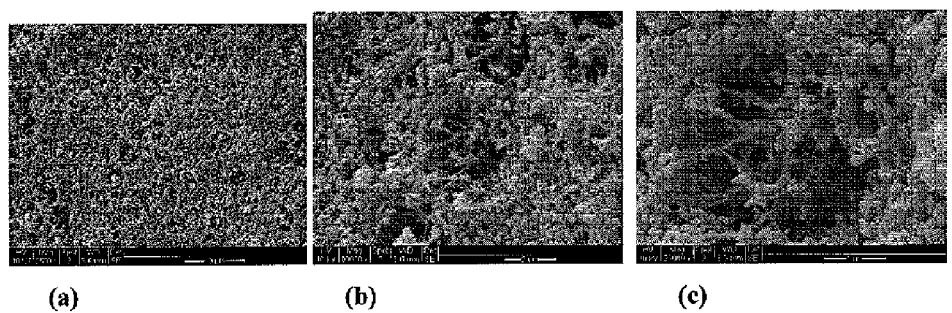
FIG. 14 (a,b,c) is Scanning Electron Micrographs of nano-structured micro-porous catalysts prepared according to Example B-1 at increasing magnifications showing the hierarchy of pores.
Figure 15:
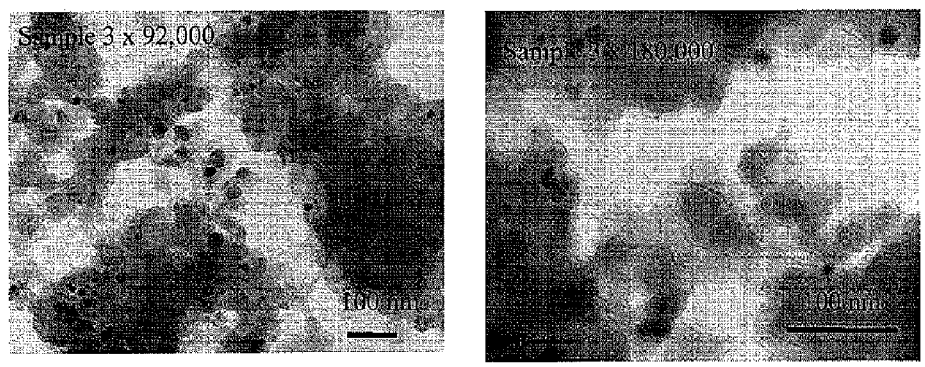
FIG. 15 (a,b) is Transmission Electron Micrographs of nano-structured micro-porous catalysts prepared according to Example B-1 at two different magnifications showing the presence of nickel oxide clusters with size of approximately 10-30 nm.

The aqueous phase contained 250 g Bindzil CC-30 mixed with 72.70 g $Ni(NO_3)_2.6H_2O$ salt to obtain [Ni]/[Si]=1/5. The aqueous phase volume fraction was 90%. 225 g of aqueous phase was dosed for 10 min into 25 g of aqueous phase; continue mixing for another 20 min using the method described in Example-A. After the formation of HIPE, polymerisation was carried out at 60° C. over night, then cut and dried at room temperature and continued to dry at 100° C. before calcination at 600° C. Calcination was carried out in two steps. Initially, calcination was carried out under nitrogen with heating from room temperature to 600° C. over a period of 60 min. Sample was kept at this temperature for another hour before it was allowed for oxidation by keeping the sample in air at 600° C. Then it was allowed to cool down. Scanning electron micrographs of the samples indicate a highly porous structure as shown in FIGS. 14(a,b,c). Transmission electron micrograph of this catalyst is shown in FIG. 15 (a,b) at two different magnification. This figure indicates that the catalyst size is in the range of 10-30 nm. Chemical and X-ray diffraction (XRD) analysis indicate complete absence of carbon.

Example B-2

Formation of Nano-Structured Micro-Porous Catalysts Using Microwave Radiation

We used a microwave radiation reactor with variable power input and temperature control. It was manufactured by Milestone/Italy with trade name Ethos-1. 20 ml of the supported catalyst precursor stock solution either [Ni]/[Si]=1/5 or [Co]/[Ni]=1/5 was placed in a 250 ml round bottom flask with an outlet for gases to escape and it was irradiated in a microwave radiation reactor. Maximum power available in this machine was 1000 W. Time taken for the decomposition of nickel nitrate or cobalt nitrate varied depending on the microwave power input. The decomposition of nickel nitrate was accompanied with the evolution of oxides of nitrogen and formation of black nickel oxide solid or cobalt oxide solid in the form of expanded flakes. Table 1 illustrate the drastic reduction of reaction time with power input. In all cases, temperature did not rise beyond 250 C.

TABLE 1

Variation of reaction time for the decomposition of nickel nitrate and cobalt nitrate in the formation of mixed oxides with silica. Reaction at 100 W microwave power did not take place.

| | Power (W) | | | | | | |
|---|---|---|---|---|---|---|---|
| | 100 | 200 | 300 | 400 | 500 | 800 | 1000 |
| Reaction time (sec) [Ni]/[Si] = 1/5 | >3600 | 650 | 410 | 280 | 205 | 80 | 55 |
| Reaction time (sec) [Co]/[Si] = 1/5 | >3600 | 385 | 265 | 175 | 130 | 65 | 45 |

The X-Ray Diffraction (XRD) measurements indicated that the size of the NiO particles was constant at 3.53±0.19 nm.

Figure 16:
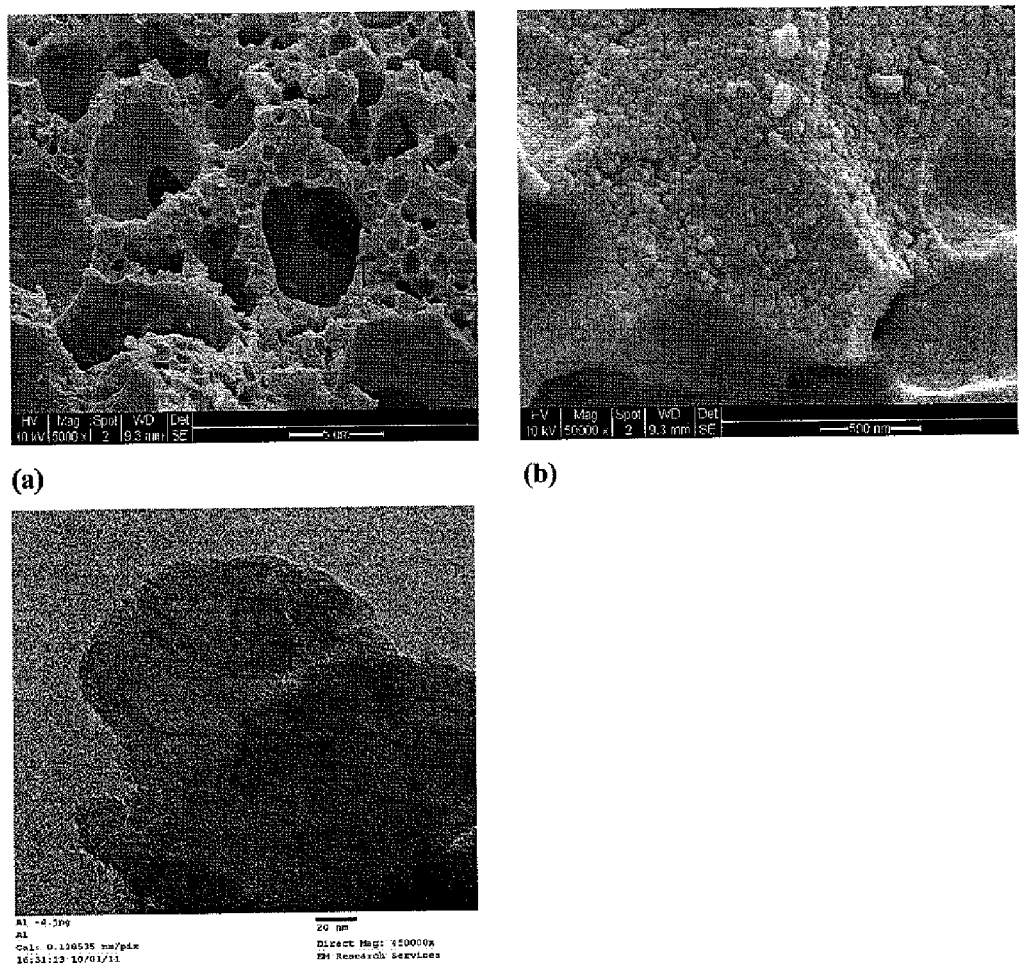
FIG. 16 (a,b,c) represents the Scanning Electron Micrographs (a,b) and Transmission Electron Micrograph (c) showing the micro- and nano-structure of the supported nickel catalyst prepared according to Example B-2 ([Ni]/[Co]=1/5) at different magnifications. The hierarchy of pore structure (a, b) and the small, uniform size of the catalyst clusters (size ca. 3.53 nm) are illustrated.

In order to increase the catalyst concentration, subsequent catalysts were prepared at [Ni]/[Si]=1/4 as well as [Co]/[Si]=1/4. After microwave irradiation the surface area of this [Ni]/[Si]=1/4 catalyst was found to be 212 m²/g. As these samples are reduced at 550-600° C. before being used in reactions, we re-calcined them at 600° C. for 2 hours in air. This also ensures the decomposition of any residual $Ni(NO_3)_2$ after microwave irradiation. After this high temperature thermal calcinations process, surface area was reduced to 181 $m^2/g$. The Scanning Electron Microscopy and Transition Electron Microscopy of the supported catalyst samples are illustrated in FIGS. 16 (*a,b,c*) which show the hierarchy of the pore structure. This catalyst was coded as AA-1 and used in the catalytic plasma synthesis of ammonia.

Example B-3

Formation of Nano-Structured Micro-Porous Catalysts Using Thermal Calcination Only Instead of using microwave irradiation followed by thermal calcinations at 600° C. before catalyst reduction, the supported catalyst precursor solution containing [Ni]/[Si]=1/4 was thermally calcined at 300° C. The pH of the silica dispersion (Bindzil CC30) was pH=7.9 while the natural pH of the supported catalyst precursor solution containing [Ni]/[Si]=1/4 was pH=5.5. The pH of this solution was reduced to pH=0.2 by the addition of 3 ml of concentrated nitric acid (69 wt %) to 100 ml of the stock solution. The resulting solution was then first heat treated at 300° C. for 1 hour. This resulted in a highly expanded flaky black solid nickel oxide with surface area of 217 $m^2/g$. When this solid was re-calcined at 600° C., the surface area was reduced to 203 $m^2/g$. Once again, the structure of this catalyst is similar to that observed in Example B-2.

Example B-4

Preparation of Dense Supported Catalyst

Catalysts prepared in Examples B-1 to B-3 were highly porous with porosity ca. 70-90%. As a result they are not strong and need to be used in fixed bed reactor configuration. In order to produce dense supported catalysts with controlled porosity, the supported catalyst precursor solution is first allowed to dry and then calcined. However, the drying process is long and the catalyst distribution is non-uniform while the resulting catalyst is in particulate form with a wide particle size distribution. In order to obtain uniform particle size with a pre-determined porosity, we use a novel process as described below.

Figure 17:
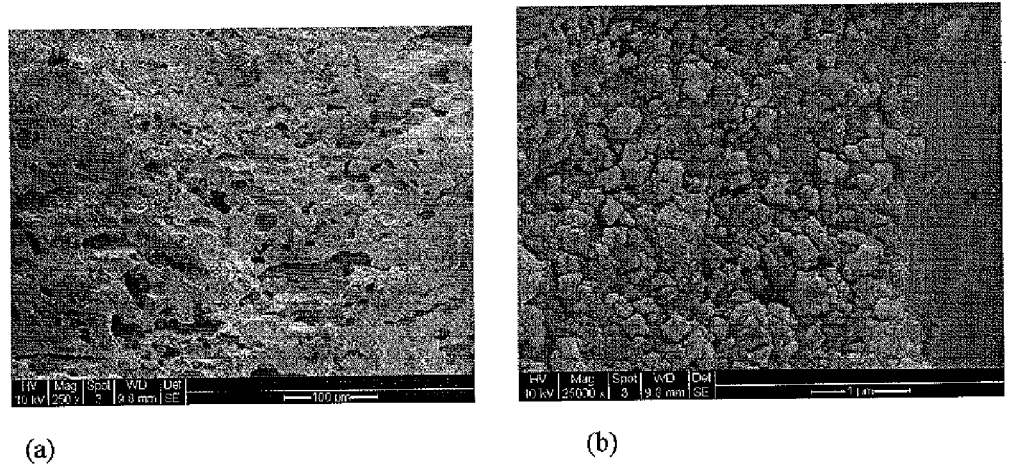
FIG. 17 (a,b) represents the Scanning Electron Micrographs of the catalyst structure prepared according to Example 8-4 showing the dense porous catalyst structure (a) and the interface at high magnification.

The supported catalyst precursor solution containing Bindzil (silica/support source) and nickel nitrate (catalyst source) with [Ni]/[Si]=1/5 was gradually added to an internal mixer used for mixing highly viscous compounds. The particular type of the mixer is called a Haake mixer with capacity of 50 ml with two sigma blades operating at 60 rpm. The temperature of the mixer was kept at 120° C. The top of the mixer was open to a fume extraction system to allow vapour and gases to escape. As the liquid level dropped, more stock solution was added so that the solid content in the mixer continuously increased at the same volume. When a highly concentrated saturated solution was obtained, the amount of additional stock solution became very small and further mixing of the highly viscous material in the mixer resulted in a sudden increase in mixer torque and temperature (from 120 to 140° C.) with the evolution of gases (oxides of nitrogen) followed by a sudden fall and secession of gas evolution. The gas evolution was a result of nickel nitrate decomposition at the mixer wall due to viscous heat generation during shear deformation within the thin film between the wall and the mixer blade. This reaction is in fact similar to that observed in the Examples B-2 and B-3. When the reaction at the interface was complete, instead of the mixing of highly viscous fluid, a granular material was obtained. However, some highly viscous material was still present stuck to the blades due to inefficient mixing. Furthermore, due to the incomplete reaction, the colour of the material was still green. This material was then recovered and calcined in air at 600° C. for 2 hours starting at room temperature with heating rate of 10° C./min. When this material was examined using SEM, it was found to be porous as shown in FIG. 17. The surface area of this catalyst was found to be 205 $m^2/g$ after calcination.

The porosity of dense supported catalyst can be controlled by incorporating polymers such as Polyethylene glycol. During calcinations polymer is burnt off to create more extensive porosity at micron-submicron level.

Example C

Preparation of Coated Catalysts

The power consumption in plasma reactors is lowered by using the catalyst as a dielectric barrier to allow the generation and maintenance of plasma. However this is not always possible since most high temperature metal catalysts are conductors of electricity with very low dielectric constant (permittivity). In order to circumvent the very low permittivity of the catalysts, so that at least one electrode is used in contact with catalyst, we developed porous catalysts with a porous coating made from very high permittivity (such as Barium titanate, $BaTiO_3$ with permittivity ca. 1000 or Potassium tantalite niobate with permittivity of 34,000) or high permittivity (such as Barium oxide, with permittivity ca. 34 or titanium dioxide with permittivity of 100). Other suitable coating material is silica (permittivity of 4) which is also used as catalyst support.

There are several particle coating methods available if the particles are dense. However, the coating of highly porous, relatively fragile materials with a specific porous inorganic material such as Barium oxide or Barium titanate have several restrictions placed on the method of coating.

Example C-1

Coating of Highly Porous Silica Supported Nickel Catalyst Using Crosslinked Vinyl Silane and Styrene Co-Polymer Silica supported nickel catalyst prepared in accordance with Example B-2 (Catalyst coded AA-1) was used in this example. 10 ml of the supported catalyst precursor stock solution either [Ni]/[Si]=1/4 was placed in a 250 ml round bottom flask with an outlet for gases to escape and the sample was microwave irradiated at the maximum available power (1000 W) input to obtain mainly flaky nickel oxide with some unreacted nickel nitrate. The process was repeated until 10 gram of sample was obtained. This sample was then added 40 gram of water to obtain a saturated slurry of catalyst for coating.

A polymerisable oil phase is prepared which consisted of:
Divinylbenzene, DVB (cross-linking agent)=20 wt %
SPAN 80 (surfactant)=12 wt %
Vinyl trimethoxy silane (VTMS, co-monomer)=40 wt %
Styrene=37 wt %
Lauryl peroxide (oil phase initiator)=2%

40 gram of this oil phase was kept at 60° C. for one hour to start polymerising. It was then added to the saturated slurry prepared above containing the highly porous catalyst while gently mixing. It was left to polymerise for another 8 hours at 60° C. in closed containers. After the completion of the polymerisation and crosslinking, the resulting material was calcinated at 600° C. first in nitrogen atmosphere for one hour and then in air for another hour. This material was fractured to obtain particulates which indicated that it was suitable for plasma generation between two electrodes without the need for a dielectric barrier using the electrode configuration as in FIG. 13.

The surface area of the uncoated catalyst was 212 m$^2$/g before calcinations and it was reduced to 181 m$^2$/g after calcinations. Following the coating process and calcinations, the surface area increased to 236 m$^2$/g. Scanning electron microscopy studies indicated the formation of a skin-core structure with highly porous skin having low concentration of Nickel compared with the core as determined by Energy Dispersive X-ray (EDX) analysis.

Example C-2

Coating of Highly Porous Silica Supported Nickel Catalyst Using Barium Oxide

Silica supported nickel catalyst prepared in accordance with Example B-2 was used in this example. 10 ml of the supported catalyst precursor stock solution either [Ni]/[Si]=1/4 was placed in a 250 ml round bottom flask with an outlet for gases to escape and the sample was microwave irradiated at the maximum available power (1000 W) input to obtain mainly flaky Nickel oxide with some unreacted nickel nitrate. The process was repeated to obtain 10 gram sample which was then 50 gram of water to obtain a concentrated catalyst slurry.

This slurry was added 30 g solution of Bindzil CC30 containing nickel nitrate at a molar ratio of [Ni]/[Si]=1/3. This solution was microwaved for 5 minutes until the sample stopped generating nitrogen oxide gases. This process was resulted in the formation of stronger particulates of nickel oxide with reduced surface porosity. The Scanning Electron Microscopy of this sample indicated, through EDX-analysis that the molar ratio of [Ni]/[Si] was higher on the surface compared with the inner part of the catalyst particles. The surface area of this sample was 82.4 m$^2$/g. Upon calcinations at 600° C., surface area was increased to 178 m$^2$/g.

We added 45 g water to 15 g of the above sample to obtain a saturated slurry followed by microwave radiation to remove water so that the moisture content of the catalyst powder was ca. 50 wt %. This moist powder was added dry BaO powder gradually while mixing. This resulted in the formation of highly viscous Ba(OH)$_2$ layer on the particles and agglomeration of the catalyst particles. This process was repeated until 10 g BaO was used. The resulting particulate material was microwaved for 5 minutes while mixing to evaporate all water. It was subsequently calcined in air at 600° C. for two hours starting from the ambient temperature at a heating rate of 10° C. This resulted in the reformation of BaO from Ba(OH)$_2$. The resulting coated catalyst was suitable for plasma generation between two electrodes without the need for any dielectric barrier. This coated catalyst sample was used in catalytic plasma synthesis of ammonia.

Example C-3

Coating of Highly Porous Silica Supported Nickel Catalyst Using Barium Titanate Particles Silica supported nickel catalyst prepared in accordance with Example B-2 was used in this example. 10 ml of the supported catalyst precursor stock solution either [Ni]/[Si]=1/4 was placed in a 250 ml round bottom flask with an outlet for gases to escape and the sample was microwave irradiated at the maximum available power (1000 W) input to obtain mainly flaky nickel oxide with some unreacted nickel nitrate. The process was repeated to obtain 10 gram sample which was then added 45 gram of water to obtain a concentrated catalyst slurry.

This slurry was added 30 g solution of Bindzil CC30 containing nickel nitrate at a molar ratio of [Ni]/[Si]=1/3. This solution was microwaved for 5 minutes until the sample stopped generating nitrogen oxide gases obtaining a stronger particulates of nickel oxide. The Scanning Electron Microscopy of this sample indicated, through EDX-analysis that the molar ratio of [Ni]/[Si] was higher on the surface compared with the inner part of the catalyst particles. This process was repeated until sufficient amount of intermediate nickel oxide sample was obtained. The surface area of this sample was 82.4 m$^2$/g. Upon calcinations at 600° C., surface area was increased to 178 m$^2$/g.

Figure 18:
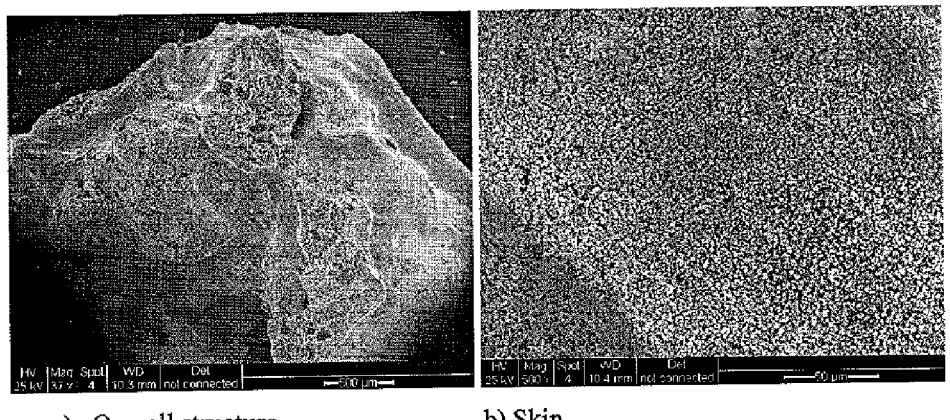
FIG. 18 (a,b,c) represents the Scanning Electron Micrographs of the Barium titanate coated silica supported nickel catalyst prepared according to the example C-3. a) Coated catalyst particle which was deliberately damaged to reveal its inner structure; b) Skin structure c) Core structure.
Figure 18:
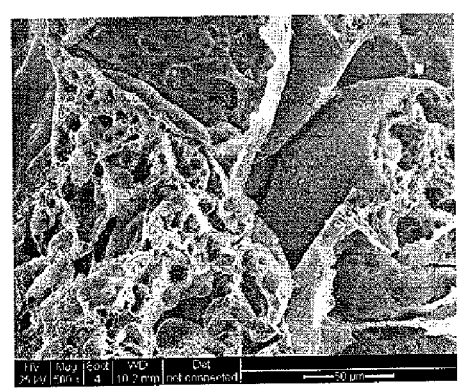

30 g of the above intermediate porous nickel oxide particles were added 60 gram water to obtain a slurry. We also dispersed 30 g barium titanate (BaTiO$_3$) powder into 30 g Bindzil CC30 solution. The resulting dispersion was mixed with the above catalyst slurry and the resulting dispersion was microwaved while mixing until a dry powder was obtained. It was subsequently calcined in air at 600° C. for two hours starting from the ambient temperature at a heating rate of 10° C. The resulting coated catalyst was suitable for plasma generation between two electrodes without the need for a dielectric barrier. The surface area was 130 m$^2$/g. The Scanning electron microscopy studies of this coated catalyst are illustrated in FIGS. 18 (a,b,c). This figure indicates the presence of a uniform coating of barium titanate particles covering the porous catalyst. EDX-analysis of the surface and the area just below the coating showed that the skin was indeed barium titanate rich with small amount of nickel.

On the skin the atomic concentrations were: Oxygen=68.5; Silicon=15.8%; (Titanium+Barium)=14.7 (Barium titanate); Nickel=1.0 Within the core of the coated catalyst the corresponding concentrations were: Oxygen=68.9; Silicon=21.6%; (Titanium+Barium)=0.9 (Barium titanate); Nickel=8.6

Example C-4

Coating of Highly Porous Silica Supported Nickel Catalyst Using With Barium Titanate Through in-situ Reaction Between Barium Oxide and Titanium Dioxide This method of catalyst coating is similar to that described in Example C-2. 36.7 g barium oxide powder and 16 g titanium dioxide powder were mixed (so that [Ba]/[Ti]=1.2) in hexane followed by the evaporation of hexane to obtain a well mixed powder. 150 g silica supported nickel catalyst precursor solution containing Bindzil CC30 and nickel nitrate at molar ratio of [Ni]/[Si]=1/4 was prepared. This solution was heat treated for 2 hours at 300° C. to obtain 42.4 g highly flaky mixed nickel oxide/silica powder. The surface area of this material was 217 m$^2$/g. 20 gram of this sample was added 60 gram water to obtain a slurry followed by the addition of 60 g of Bindzil CC30 and nickel nitrate solution with [Ni]/[Si]=1/3. It was microwaved at 1000 W until no more gases were evolved. The resulting particulate material was added sufficient water to obtain a saturated powder. This wet powder was added gradually 36.7 g barium oxide powder and 16 g titanium dioxide powder prepared above while mixing gently. After the addition of all the powder was complete, the resulting mixture was added sufficient water to obtain saturated slurry again which was kept at 100° C. for 24 hours in a sealed vessel. Subsequently, it was microwaved at 1000 W while mixing gently to obtain particulate coated particles. These particles were then calcined in air at 600° C. for 2 hours starting from room temperature with heating rate of 10° C./min. The surface area of the coated silica supported nickel catalyst was 65.2 m$^2$/g.

Figure 19:
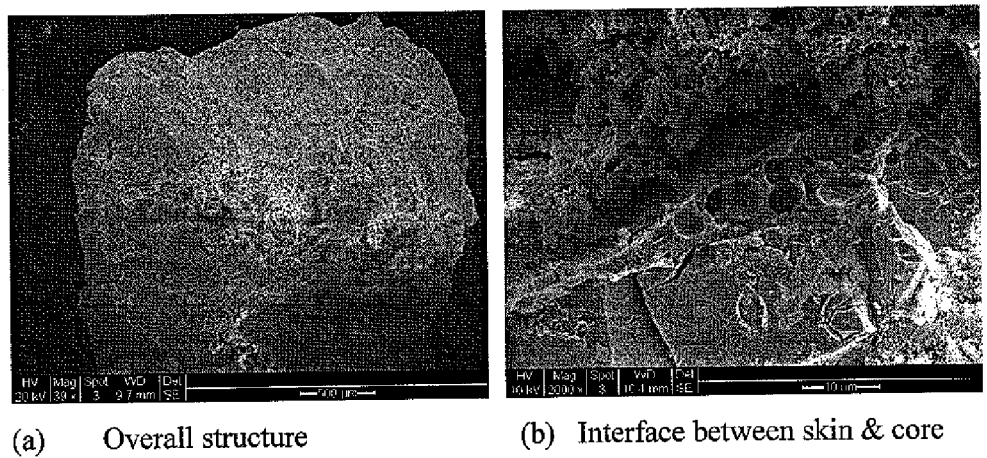
FIG. 19 (a,b) represents the Scanning Electron Micrographs of the Barium titanate coated silica supported nickel catalyst prepared according to the Example C-4. a) Overall appearance; b) Skin and core structures at the interface.

Scanning Electron Microscopy and EDX analysis show the formation of a skin core structure as shown in FIGS. 19 (*a,b*). The coated catalyst particle is shown in FIG. 19(*a*) while the interface between the coating and catalyst is shown in FIG. 19(*b*)*which* indicates that both coating and inner catalyst are porous. EDX-analysis of the skin and core (just below the skin) indicated the following atomic concentrations:

Skin: Oxygen=75.0%; (Ti+Ba)=20.7% (barium titanate); Ni=2.9; Si=1.4 Core (just below skin layer): Oxygen=63.7%; Ni=9.7%; Si=23.4%; (Ba+Ti)=3.2% (barium titanate).

The resulting coated catalyst was suitable for plasma generation between two electrodes without the need for a dielectric barrier.

Example D

Performance of Catalytic Plasma Reactors

Ammonia synthesis is well studied and detailed literature is available such as given by M. Appl; Ammonia, Wiley-VCH Verlag GmbH, Weinheim, Germany, 1999. In Appl (1999) (page 20), variation of ammonia content in equilibrium with synthesis gases ($N_2$:$H_2$=1:3) is tabulated as a function of pressure and temperature. At pressures of 1000 bar and low temperatures (300° C.) ammonia conversion above 90% is possible. As the temperature is increased the conversion is reduced to 37% at 600° C. at 1000 bar.

Although the ammonia synthesis reaction is exothermic (with heat of reaction ca. −45 kJ/mole which increases with pressure and decreases with temperature when the pressure is high), the reaction is not spontaneous since the Gibbs free energy for the dissociation of nitrogen ($N_2 \leftrightarrows 2N$) is $\Delta F°_{298}$=911 kJ/mole. The dissociation of nitrogen is considered to be the rate determining step for ammonia synthesis which therefore indicates the important role played by the catalysts. It also explains why plasma can enhance ammonia reaction.

Non-plasma ammonia reaction mechanism has been well studied and rate equations are available (Appl 1999). It is clear that the reaction rate rapidly decays with ammonia conversion whereas an optimum temperature is present as a function of pressure. Therefore, in most industrial operations, typical temperature range is 300-550 C and pressure range is 150-250 bar. Nevertheless, for industrial operations, only ca. 10-15% conversion occurs over the catalyst bed and the reaction mixture is cooled in order to recover the product (ammonia) and recycle the non-reacted gases.

Experimental Conditions

We used a concentric annular cylindrical quartz reactor which consisted of two quartz tubes (FIGS. 9-11). The quartz tubes were 300 mm long. The outer tube had internal diameter of 32 mm. The external diameter of the inner tube was 17 mm. The wall thickness of the quartz reactor was 1.6 mm. Gases were introduced through a side arm. The gas outlet was from the top end of the quartz tube. The central part of the reactor can be placed in a temperature controlled cylindrical oven which provided a means of temperature control. When the reactor temperature was needed to be lowered to remove the heat of reaction, air was blown on the surface of the reactor while switching off the oven. The inner electrode could also be controlled by passing air through the inner tube which contained the inner electrode as a metal mesh.

Pressurised gases ($N_2$, $H_2$) were stored in cylinders. Each gas line had a mass flow controller purchased from Bronkhorst UK. The gas lines were then connected via a four way union to a single feed line to the reactor. The reactor was fitted with a pressure gauge and a pressure relief valve. A shut off valve was placed at the reactor outlet followed by a metering valve. The outlet line was fitted with a heating coil and wrapped with insulating wool to maintain gas temperature and feeds directly to the gas chromatography. The outlet line was connected directly to a GC for online analysis.

Here, we used two different catalysts: Co/$SiO_2$ or Ni/$SiO_2$ (in both cases Metal/$SiO_2$=1:4) as described in previously in Example B-2. Prior to the reaction, catalyst was heat treated at 600° C. in air for 2 hours in a furnace and then reduced at 550° C. in a hydrogen flow (50 ml/min) for 24 h within the reactor using the tubular furnace to control the temperature. Surface area of the nickel catalyst was 181 m$^2$/g while that of the cobalt catalyst was 164 m$^2$/g.

In all cases, the volume of the catalyst bed was 100 ml which occupied the 18 mm long central region of the reactor tube where the electrodes in the form of a steel mesh were present. The remaining region from both ends was filled with 1 mm glass balls to prevent the escape of the catalyst.

Total flow rate of $H_2$ and $N_2$ was constant at 25 ml/min with [$H_2$]/[$N_2$]=3. The high voltage power source was either at 10 kV or 15 kV. Input voltage was at the maximum level and the power consumption in the reactor was measured. The temperature inside the reactor was measured at the end of reaction by a thermocouple. Ammonia concentration in the reaction mixture was also determined through acid-base titration one hour after the start of the ammonia synthesis experiment.

Example D-1

Both Electrodes Isolated with Input Electrical Potential of 10 kV

Both electrodes were shielded by quartz walls of the reactors. 20 g Co/$SiO_2$ or Ni/$SiO_2$ catalyst (described in Example B-2 with [Metal]/[Si]=1/4) were used. In separate experiments, we also filled the reactor with 3 mm diameter glass balls or 3 mm diameter barium titanate balls to determine the contribution of plasma only to ammonia conversion. Therefore in further experiments, we used a mixture of catalyst and barium titanate balls. Throughout, the temperature of the reactor was kept at 240° C. The results are tabulated in Table 2.

Example D-2

Only One Electrode Isolated with Input Potential of 10 kV

We also carried out experiments using one isolated electrode. Although non-coated catalysts could not be used with one isolated electrode (electrode in the inner tube), all of the coated catalysts could be used in plasma generation. It was also found that plasma could be generated when 8 gram of uncoated catalyst (AA-1) was dispersed into barium titanate balls.

We found that the very similar ammonia conversions were obtained by this method compared to the example D-1, but at considerably lower power consumption (approximately 30%). The results are tabulated in Table 2 and compared with the examples of D-1 when both electrodes were isolated.

It can be seen that conversion rates of above 5% could be achieved at 240° C. in both electrode configuration. This levels of conversion is above 90% of the maximum conversion (equilibrium) achievable at 240° C. and 1 bar. We only needed to use 8 g catalyst when barium titanate balls were used as filler.

TABLE 2

Performance of plasma reactor and catalyst in ammonia production

| Catalyst Description | Power (W)* | Ammonia Conversion (%)* | Power (W)** | Ammonia Conversion (%)** |
|---|---|---|---|---|
| $Co/SiO_2$ (1/4) catalyst (BB-10) 20 g | 140 | 3.8 | NP* | NP* |
| $Ni/SiO_2$ (1/4) catalyst (AA-1) 20 g | 140 | 5.2 | NP* | NP* |
| Barium oxide coated $Ni/SiO_2$ (Example C-2) 45 g | 141 | 4.3 | 85 | 4.6 |
| Glass balls only, 165 gram | 115 | 2.8 | — | — |
| Barium titanate balls only, 330 g | 93 | 3.4 | 77 | 3.4 |
| 8 g $Ni/SiO_2$ catalyst (AA-1) + 165 g barium titanate balls | 115 | 5.6 | 87 | 5.7 |
| 32 g barium oxide coated $Ni/SiO_2$ catalyst + 98 g barium titanate balls | 113 | 5.2 | 86 | 5.6 |

Notes:
*Both electrodes are isolated by quartz reactor walls (FIG. 9)
**Only inner electrode is isolated and the outer electrode is in contact with catalyst (FIG. 10)

Example D-3

Only One Electrode Isolated with Input Potential of 15 kV

In this example, we increased electric potential from 10 kV to 15 kV and used the inner electrode behind the quartz wall and the other electrode in contact with the catalyst. The catalyst was $Ni/SiO_2$ (1/4) catalyst (AA-1). We used 8 gram of this catalyst dispersed into 165 g 3 mm diameter barium titanate balls. Wall power was 195 W while the conversion reached 7.6%. However, in order to lower the temperature, the reactor was cooled to 230° C. The corresponding conversion at electric potential of 10 kV with one isolated electrode was 5.7% at power consumption of 86 W.

Further information including typical operating temperatures is set out in Table 3 which is annexed to this description.

It will be appreciated by persons skilled in the art that the above embodiments have been described by way of example only and not in any limitative sense, and that the various alterations and modifications are possible without departure from the scope of the invention as defined by the appended claims.

Alternative sources of fuel instead of using biomass include biomass waste, fossil fuels, fossil fuel processing by-products and municipal solid waste amongst others.

TABLE 3

Reactors for Syngas-to-Ammonia Synthesis
Annex to the description

| Reactor System | Reactor Component Code and (number) | Reactor Function | Input | Output | Intensification Field (s) | Membrane Type | Catalyst | Temperature Range (° C.) | Typical Pressure (Bar) |
|---|---|---|---|---|---|---|---|---|---|
| MR-2a | RC-1 (R1) | Separation of $O_2$ from air | Air | 1) $N_2$ + ($O_2$) 2) $O_2$ | 1) Electric 2) Combustion 3) Temperature | $O_2$ selective NEMCA | Ni | 600 | 50 |
| | RC-2 (R2) | Oxy Gasification of biomass with carbon dioxide circulation | Biomass + $O_2$ | Syngas | 1) $O_2$ use 2) Process design | $O_2$ selective NEMCA | Ni | 50-1500 | 1 |
| | RC-3 (R3) | Syngas cleaning/ conditioning | Syngas | Clean Syngas | 1) Electric 2) Plasma | — | Ni | 50-500 | 1 |
| MR-2b | RC-1 (R4) | Separation of $O_2$ from Reactor-1 output | $O_2$ depleted air | $N_2$ | 1) Electric 2) Combustion 3) Temperature | $O_2$ selective NEMCA | Ni | 600 | 50 |
| | RC-2 (R5) | Combustion of $H_2$-depleted syngas from Reactor-6 | $H_2$ depleted syngas | Heat/power steam from syngas + $CO_2$ | $O_2$ use | $O_2$ selective NEMCA | Ni | 1000 | 1 |

TABLE 3-continued

Reactors for Syngas-to-Ammonia Synthesis
Annex to the description

| Reactor System | Reactor Component Code and (number) | Reactor Function | Input | Output | Intensification Field(s) | Membrane Type | Catalyst | Temperature Range (° C.) | Typical Pressure (Bar) |
|---|---|---|---|---|---|---|---|---|---|
| MR-2c | RC-1 (R6) | $H_2$ separation from clean syngas | Clean syngas + water | $H_2$ + $H_2$-depleted syngas | 1) Electric | $H_2$ selective NEMCA | Ni | 600 | 10 |
|  | RC-2 (R7) | Ammonia synthesis | $N_2$ + $H_2$ | $NH_3$ | 1) Electric 2) Plasma | $H_2$ selective $O_2$ selective NEMCA | Co, Fe, Ru | 500 | 1 |
|  | RC-3 (R8) | Ammonia separation | $NH_3$ $H_2$ $N_2$ | $NH_3$ + ($H_2$ + $N_2$) | — | — |  | −10 | 1 |

The invention claimed is:

1. A method of production of ammonia comprising the steps of:
   in a first reactor system, extracting oxygen from air using an oxygen selective membrane, thereby producing nitrogen enriched air, and gasifying combustible material in a gasifier, using said oxygen extracted from said air, to produce syngas;
   in a second reactor system, receiving a hydrogen-depleted syngas from a third reactor system and removing oxygen from said nitrogen enriched air by combustion to produce oxygen-depleted nitrogen enriched air and a carbon dioxide output, with the carbon dioxide output recycled to the gasifier in the first reactor system; and
   in the third reactor system, separating hydrogen from said syngas directly from said first reactor system to produce hydrogen-depleted syngas and reacting said hydrogen with said oxygen-depleted nitrogen enriched air from said second reactor system to produce ammonia.

2. A method according to claim 1, wherein said step of separating hydrogen from said syngas comprises extracting said hydrogen from the syngas using at least one hydrogen selective membrane.

3. A method according to claim 1, wherein said reacting to produce ammonia takes place in a plasma reactor.

* * * * *